(12) United States Patent
Yaghi et al.

(10) Patent No.: US 11,813,587 B2
(45) Date of Patent: Nov. 14, 2023

(54) ZIRCONIUM TEREPHTHALATE-BASED METAL ORGANIC FRAMEWORK WITH OPEN METAL SITES

(71) Applicant: The Regents of the University of California, Oakland, CA (US)

(72) Inventors: Omar M. Yaghi, Berkeley, CA (US); Philipp Urban, Oakland, CA (US); Seungkyu Lee, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 585 days.

(21) Appl. No.: 16/640,629

(22) PCT Filed: Aug. 29, 2018

(86) PCT No.: PCT/US2018/048512
§ 371 (c)(1),
(2) Date: Feb. 20, 2020

(87) PCT Pub. No.: WO2019/046404
PCT Pub. Date: Mar. 7, 2019

(65) Prior Publication Data
US 2020/0353440 A1 Nov. 12, 2020

Related U.S. Application Data

(60) Provisional application No. 62/552,740, filed on Aug. 31, 2017.

(51) Int. Cl.
*B01J 20/22* (2006.01)
*B01D 53/047* (2006.01)
*B01J 20/30* (2006.01)
*B01J 31/16* (2006.01)
*B01J 37/04* (2006.01)
*B01J 37/08* (2006.01)
*C07F 7/00* (2006.01)
*C10L 3/10* (2006.01)

(52) U.S. Cl.
CPC .......... *B01J 20/226* (2013.01); *B01D 53/047* (2013.01); *B01J 20/3078* (2013.01); *B01J 20/3085* (2013.01); *B01J 31/1691* (2013.01); *B01J 37/04* (2013.01); *B01J 37/08* (2013.01); *C07F 7/003* (2013.01); *C10L 3/102* (2013.01); *C10L 3/106* (2013.01); *B01D 2253/204* (2013.01); *B01D 2256/245* (2013.01); *B01J 2531/004* (2013.01); *B01J 2531/48* (2013.01); *C10L 2290/542* (2013.01)

(58) Field of Classification Search
CPC .......... B01D 2253/204; B01J 31/1691; B01J 20/226; B01J 31/069; B01J 31/123; C07C 51/418; C07F 7/003
See application file for complete search history.

(56) References Cited

U.S. PATENT DOCUMENTS 10,287,304 B2 * 5/2019 Yaghi ............... B01D 53/047
2015/0034500 A1 * 2/2015 Kim ............... B01J 20/28011
423/406

FOREIGN PATENT DOCUMENTS

| JP | 2015-145454 A | 8/2015 | |
| JP | 2017088542 A | 5/2017 | |
| WO | WO-2015127033 A1 * | 8/2015 | ............. B01D 33/00 |
| WO | WO-2016168092 A1 * | 10/2016 | ............. B01J 20/226 |
| WO | 2018/046930 A1 | 3/2018 | |

OTHER PUBLICATIONS

S. Lee et al., 231 Faraday Discussions (2021) (Year: 2021).*
Q. Pang et al., 3 Small Struct. (2022) (Year: 2022).*
U. Demir et al., 40 Chem. SOc. Rev., 2751-2798 (2020) (Year: 2020).*
W. Zhou et al., 130 Journal of the American Chemical Society, 15268-15269 (2008) (Year: 2008).*
C. Piscopo et al. 208 Microporous and Mesoporous Materials, 30-35 (2015) (Year: 2015).*
M. Eddaoudi et al., Accounts Chemical Research, 319-330 (2001) (Year: 2001).*
B. Bueken et al., 29 Chemistry of Materials, 10478-10486 (2017) (Year: 2017).*
X. Kong et al., 134 Journal of the American Chemical Society, 14341-14344 (2012) (Year: 2012).*
H. Jiang et al., 135 Journal of the American Chemical Society, 13934-13938 (2013) (Year: 2013).*
Lange, Tim, Communication Pursuant to Article 94(3) EPC, Application No. 18778612.4, European Patent Office, dated Mar. 23, 2021.
Mautschke, H.-H. et al., "Catalytic properties of pristine and defect-engineered Zr—MOF—808 metal organic frameworks", Catal. Sci. Technol., 2018, 8, 3610.
Valenzano, Loredana et al., "Disclosing the Complex Structure of UiO-66 Metal Organic Framework: A Synergic Combination of Experiment and Theory," Chem. Mater. 2011, 23, 1700-1718.
Fluch, Ulrike et al., "Uniform distribution of post-synthetic linker exchange in metal-organic frameworks revealed by Rutherford backscattering spectrometry", Chem. Comm., Jan. 1, 2017, vol. 53, No. 48, pp. 6516-6519.
Gutov, Oleksii et al., "Metal-Organic Framework (MOF) Defects under Control: Insights into the Missing Linker Sites and Their Implication in the Reactivity of Zirconium-Based Frameworks", Inorganic Chemistry, Sep. 8, 2015, vol. 54, No. 17, pp. 8396-8400.
He, Peng et al., "Spies Within Metal-Organic Frameworks: Investigating Metal Centers Using Solid-Stage NMR", J. Phys. Chem. C, Oct. 16, 2014, vol. 118, No. 41, pp. 23728-23744.

(Continued)

*Primary Examiner* — Alexander R Pagano
(74) *Attorney, Agent, or Firm* — Gavrilovich, Dodd & Lindsey LLP

(57) ABSTRACT

The disclosure provides for zirconium terephthalate-based metal organic frameworks with open metal sites, and uses thereof.

14 Claims, 6 Drawing Sheets

(56) References Cited

OTHER PUBLICATIONS

Ji, Pengfei et al., "Transformation of Metal-Organic Framework Secondary Building Units into Hexanuclear Zr-Alkyl Catalysts for Ethylene Polymerization", JACS, Aug. 23, 2017, vol. 139, No. 33, pp. 11325-11328.

Lange, Tim, Office Action, European Patent Office, Application No. 18778612.4, dated Aug. 29, 2022.

Pankajakshan, Asha et al., "Water-Stable Nanoscale Zirconium-Based Metal-Organic Frameworks for the Effective Removal of Glyphosate from Aqueous Media", ACS Omega, Jul. 31, 2018, vol. 3, No. 7, pp. 7832-7839.

Reinsch, Helge et al., "Green synthesis of zirconium-MOFs", CrystEngComm, Jan. 1, 2015, vol. 17, No. 22, pp. 4070-4074.

Wang, Weiqi et al., "BODIPY—containing nanoscale metal-organic frameworks for photodynamic therapy", Chem. Comm., Jan. 1, 2016, vol. 52, No. 31, pp. 5402-5405.

Wang, Zhe et al., "The water-based synthesis of chemically stable Zr-based MOFs using pyridine-containing ligands and their exceptionally high adsorption capacity for iodine", Dalton Trans., Jan. 1, 2017, vol. 46, No. 23, pp. 7412-7420.

Masashi, Office Action, Application No. 2020-506863, Japan Patent Office, dated Oct. 28, 2022.

Third-Party Observations, Application No. 2020-506863, Japan Patent Office, dated Aug. 2, 2022.

Caratelli et al., "Nature of active sites on UiO-66 and beneficial influence of water in the catalysis of Fischer esterification", Journal of Catalysis, Aug. 1, 2017, 352, pp. 401-414.

Taddei et al., "Mixed-linker UiO-66: structure-property relationships revealed by a combination of high-resolution powder X-ray diffraction and density functional theory calculations", Phys. Chem. Chem. Phys., Jan. 2017, 19, 1536-1542.

Vermoortele et al., "Synthesis Modulation as a Tool to Increase the Catalytic Activity of Metal-Organic Frameworks: The Unique Case of UiO-66(Zr)", Journal of the American Chemical Society, Jul. 22, 2013, 135, 11465-11468.

Gutov et al., "Supportive Information MOF defects under control: insights into the missing linker sites and their Implication in the reactivity of Zr-based frameworks", Inorganic Chemistry, Aug. 20, 2015, pp. 1-19.

Kalmutzki et al., "Secondary building units as the turning point in the development of the reticular chemistry of MOFs", Sci. Adv., Oct. 5, 2018, 4: eaat9180, 16 pages.

Kaskel, Stefan, "The Chemistry of Metal-Organic Frameworks", In: "The Chemistry of Metal-Organic Frameworks", Jan. 1, 2016, Wiley-VCH, 4 pages.

Lange, Tim, Communication Pursuant to Article 94(3) EPC, Application No. 18778612.4, European Patent Office, Feb. 28, 2023.

Lee, S. et al., "Coordinative alignment of molecules in chiral metal-organic frameworks", Science, Aug. 19, 2016, vol. 353, No. 6301, pp. 808-811.

Barkhordarian et al., "Two new proous UiO-66-type zirconium frameworks; open aromatic N-donor sites and their post-synthetic methylation and metallation," J. Mater. Chem. A, 5(11):5612-5618, Feb. 22, 2017.

Chen et al., "Tailor-made Stable Zr(IV)-Based Metal-Organic Frameworks for Laser Desorption/Ionization Mass Spectrometry Analysis of Small Molecules and Simultaneous Enrichment of Phosphopeptides," ACS Applied Mater. and Interfaces, 8(31):20292-20300, Aug. 10, 2016.

Guillerm et al., "A Series of Isoreticular, Highly Stable, Porous Zirconium Oxide Based Metal-Organic Frameworks," Angew. Chem. Intl. Ed., 51(37):9267-9271, Sep. 10, 2012.

Liang et al., "Microwave-Assisted Solvothermal Synthesis and Optical Properties of Tagged MIL-140A Metal-Oganic Frameworks," Inorganic Chemistry, 52(22):12878-12880, Nov. 18, 2013.

Waitschat et al., "Water-based synthesis and Characterisation of a new Zr-MOF with unique inorganic building unit," Chemcial Communications, 52(86): 12698-12701, Sep. 1, 2016.

Waitschat et al., "Synthesis of M-UiO-66 (M=Zr, Ce or Hf) employing 2,5-pyridinedicarboxylic acid as a linker: defect chemistry, famework hydrophilisation and sorption properties," Dalton Trans., 47(4):1062-1070, Nov. 28, 2017.

Wang et al., "The water-based synthesis of chemically stable Zr-based MOFs using pyridine-containing ligands and their exceptionally high adsorption capacity for iodine," Dalton Trans., 46(23):7412-7420, May 9, 2017.

Lange, Tim, International Search Report and Written Opinion, PCT/US2018/048512, European Patent Office, dated Jan. 4, 2019.

Wittmann-Regis, Agnes, International Preliminary Report on Patentability and Written Opinion, PCT/US2018/048512, The International Bureau of WIPO, dated Mar. 12, 2020.

\* cited by examiner

Crystal data
- space group *Pnnm*
- a = 13.4687(15) Å   90°
  b = 14.8959(17) Å   90°
  c = 21.264(2) Å      90°
- wR (all) = 0.136
  R1 = 0.044

ZIRCONIUM TEREPHTHALATE-BASED METAL ORGANIC FRAMEWORK WITH OPEN METAL SITES

CROSS REFERENCE TO RELATED APPLICATIONS

This application is a U.S. National Stage Application, which claims priority under 35 U.S.C. § 371 to International Application No. PCT/US2018/048512, filed Aug. 29, 2018, which application claims priority under 35 U.S.C. § 119 from Provisional Application Ser. No. 62/552,740, filed Aug. 31, 2017, the disclosures of which are incorporated herein by reference.

TECHNICAL FIELD

The disclosure provides for zirconium terephthalate-based metal organic frameworks with open metal sites, and uses thereof.

BACKGROUND

Metal-organic frameworks (MOFs) are made by linking inorganic and organic units by strong bonds (reticular synthesis). The flexibility with which the constituents' geometry, size, and functionality can be varied has led to more than 20,000 different MOFs being reported and studied within the past decade. The organic units are ditopic or polytopic organic carboxylates (and other similar negatively charged molecules), which, when linked to metal-containing units, yield architecturally robust crystalline MOF structures with a typical porosity of greater than 50% of the MOF crystal volume. The surface area values of such MOFs typically range from 1,000 to 10,000 m²/g, thus exceeding those of traditional porous materials such as zeolites and carbons. To date, MOFs with permanent porosity are more extensive in their variety and multiplicity than any other class of porous materials. These aspects have made MOFs ideal candidates for storage of fuels (hydrogen and methane), capture of carbon dioxide, and catalysis applications, to mention a few.

SUMMARY

Described herein is a zirconium based metal organic framework (Zr-MOF) that comprises zirconium inorganic secondary building units having the formula of $Zr_6(\mu3-O)_4(\mu3-OH)_4(—COO)_8 (OH)_4 (H_2O)_n$ that are linked together by terephthalate-based linking ligands. The Zr-MOFs described herein are characterized as generally having an orthorhombic crystal system with open metal sites. The Zr-MOF disclosed herein has several advantages over UiO-66. UiO-66 is a zirconium terephthalate-based MOF that is the most studied MOF in this field and industrially important because of its chemical stability and composition with a low-cost chemical, terephthalate. In direct contrast to UiO-66, the Zr-MOFs of the disclosure have a larger pore size which enlarges the scope of guest molecules interacting with the MOF and also has open metal sites which can be used for selective interactions with guest molecules for separation, storage, and catalysis. In addition, the open metal sites allow for further modification of the Zr-MOF of the disclosure to change the properties of the Zr-MOF.

In a particular embodiment, the disclosure provides for a zirconium containing metal organic framework (Zr-MOF) that comprises a plurality of zirconium secondary building units (SBUs) that are linked together by a plurality of linking ligands comprising the structure of Formula I:

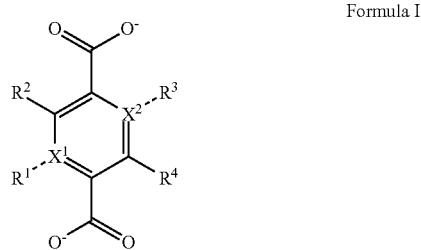

Formula I wherein, $X^1$ and $X^2$ are independently C or N, wherein if $X^1$ is an N then $R^1$ is absent, and wherein if $X^1$ is an N then $R^3$ is absent; $R^1$-$R^4$ are independently selected from the group consisting of H, D, optionally substituted $(C_1-C_6)$alkyl, optionally substituted $(C_1-C_5)$heteroalkyl, optionally substituted $(C_1-C_6)$alkenyl, optionally substituted $(C_1-C_5)$heteroalkenyl, optionally substituted $(C_1-C_6)$alkynyl, optionally substituted $(C_1-C_5)$heteroalkynyl, $(C_3-C_7)$cycloalkyl, $(C_5-C_7)$cycloalkenyl, aryl, heterocycle, hydroxyl, halo, aldehyde, nitrile, isonitrile, nitro, nitroso, cyanate, isocyanato, sulfhydryl, sulfino, sulfo, thiocyanate, isothiocyanate, carbonothioyl, boronic acid,

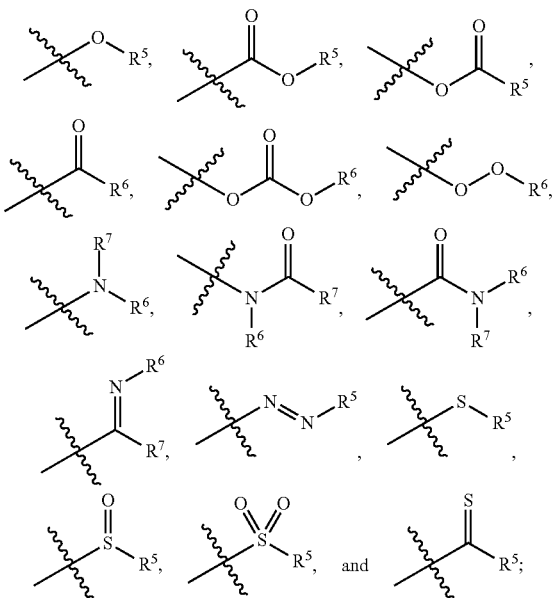

$R^5$ is selected from the group consisting of optionally substituted $(C_1-C_3)$alkyl, optionally substituted $(C_1-C_3)$alkenyl, optionally substituted $(C_1-C_3)$alkynyl, $(C_3-C_7)$cycloalkyl, $(C_5-C_7)$cycloalkenyl, aryl, and heterocycle; $R^6$ and $R^7$ are independently selected from H, D, optionally substituted $(C_1-C_3)$alkyl, optionally substituted $(C_1-C_3)$ alkenyl, optionally substituted $(C_1-C_3)$ alkynyl, $(C_3-C_7)$cycloalkyl, $(C_5-C_7)$ cycloalkenyl, aryl, and heterocycle; and wherein the Zr-MOF comprises a plurality of open metal sites. In another embodiment, a Zr-MOF disclosed herein comprises a plurality of zirconium SBUs that are linked together by a plurality of linking ligands comprising the structure of Formula I(a), Formula I(b), Formula I(c), and/or Formula I(d):

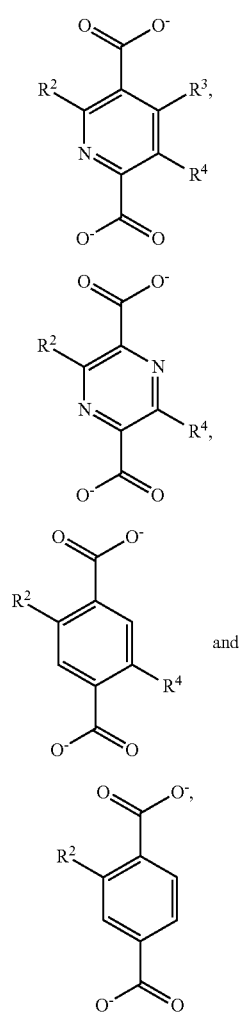

Formula I(a)

Formula I(b)

Formula I(c)

and

Formula I(d)

wherein, $R^2$-$R^4$ are independently selected from the group consisting of H, D, optionally substituted ($C_1$-$C_6$)alkyl, optionally substituted ($C_1$-$C_5$)heteroalkyl, optionally substituted ($C_1$-$C_6$)alkenyl, optionally substituted ($C_1$-$C_5$) heteroalkenyl, optionally substituted ($C_1$-$C_6$)alkynyl, optionally substituted ($C_1$-$C_5$)heteroalkenyl, ($C_3$-$C_7$)cycloalkyl, ($C_5$-$C_7$)cycloalkenyl, aryl, heterocycle, hydroxyl, halo, aldehyde, nitrile, isonitrile, nitro, nitroso, cyanate, isocyanato, sulfhydryl, sulfino, sulfo, thiocyanate, isothiocyanate, carbonothioyl, boronic acid,

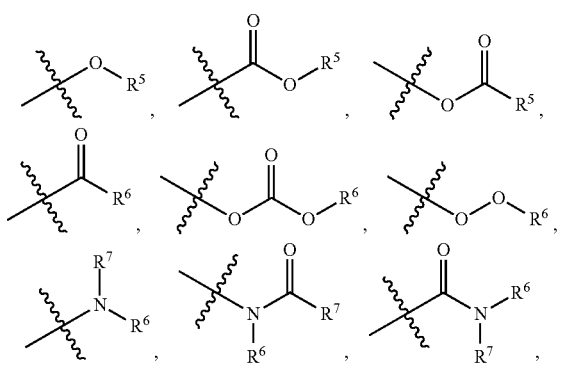

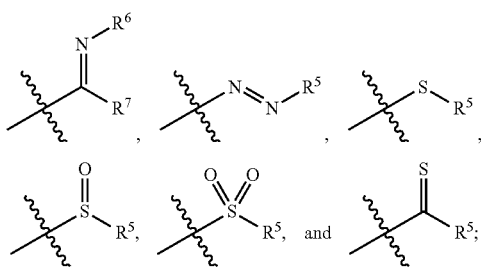

$R^5$ is selected from the group consisting of optionally substituted ($C_1$-$C_3$)alkyl, optionally substituted ($C_1$-$C_3$)alkenyl, optionally substituted ($C_1$-$C_3$)alkynyl, ($C_3$-$C_7$)cycloalkyl, ($C_5$-$C_7$)cycloalkenyl, aryl, and heterocycle; $R^6$ and $R^7$ are independently selected from H, D, optionally substituted ($C_1$-$C_3$)alkyl, optionally substituted ($C_1$-$C_3$) alkenyl, optionally substituted ($C_1$-$C_3$) alkynyl, ($C_3$-$C_7$)cycloalkyl, ($C_5$-$C_7$) cycloalkenyl, aryl, and heterocycle; and wherein the Zr-MOF comprises a plurality of open metal sites. In a further embodiment, Zr-MOF comprises a plurality of zirconium SBUs that are linked together by a plurality of linking ligands that have a structure selected from:

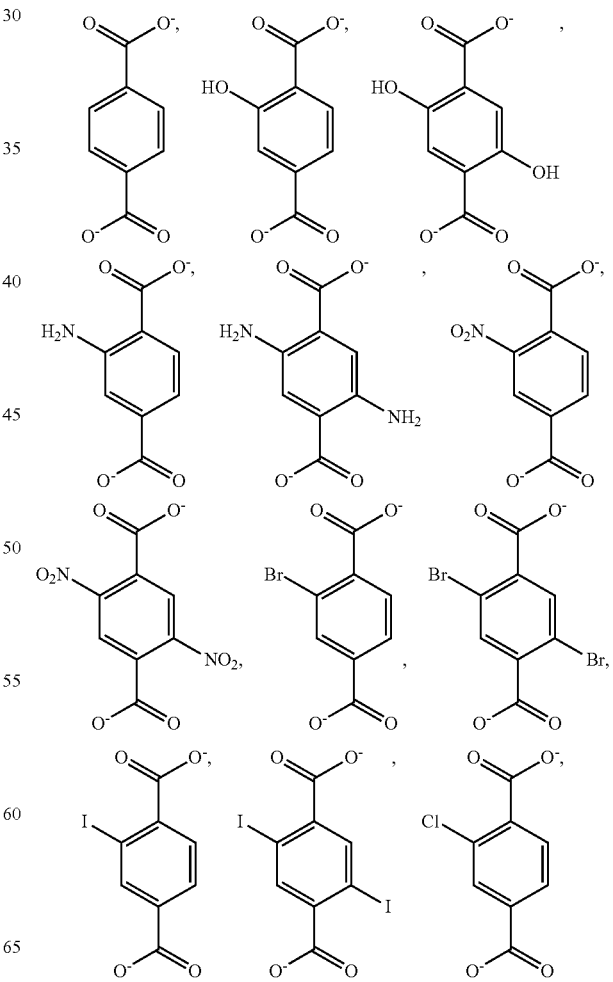

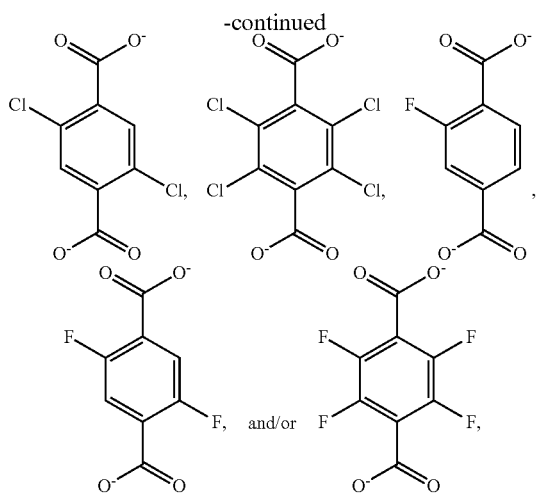

and wherein the Zr-MOF comprises a plurality of open metal sites. In a further embodiment, a Zr-MOF disclosed herein comprises a plurality of zirconium SBUs having the general formula of: $Zr_6(\mu3\text{-}O)_4(\mu3\text{-}OH)_4(\text{---}COO)_8(OH)_4(H_2O)_n$ where n is an integer less than 10. In yet a further embodiment, the Zr-MOF has an orthorhombic crystal system. In a certain embodiment, a Zr-MOF disclosed herein can be activated by removing guest molecules via calcination or by treatment with supercritical $CO_2$.

In a particular embodiment, a Zr-MOF of the disclosure is synthesized with a post framework reactant that adds at least one effect to the Zr-MOF selected from: modulating the gas storage ability of the Zr-MOF; modulating the sorption properties of the Zr-MOF; modulating the pore size of the Zr-MOF; modulating the catalytic activity of the Zr-MOF; modulating the conductivity of the Zr-MOF; and modulating the sensitivity of the Zr-MOF to the presence of an analyte of interest.

In another embodiment, the disclosure also provides for a gas separation and/or gas storage device comprising a Zr-MOF described herein. In yet another embodiment, the gas storage device is a gas tank. In a further embodiment, the gas separation device is a purifier, filter, scrubber, pressure swing adsorption device, molecular sieve, hollow fiber membrane, ceramic membrane, cryogenic air separation device, and hybrid gas separation device.

In a certain embodiment, the disclosure further provides a method of separating and/or storing one or more gases from a gas mixture comprising contacting the gas mixture with a Zr-MOF disclosed herein or a device comprising a Zr-MOF disclosed herein. In another embodiment, the gas mixture comprises a natural gas stream and the gases that are separated from the natural gas stream are acid gases and/or water vapor. In yet another embodiment, a Zr-MOF disclosed herein is used to store harmful or toxic gases. In a further embodiment, a Zr-MOF disclosed herein is used to store one or more fluids or compounds selected from the group consisting of water, $CO_2$, methane, CO, hydrocarbons, $H_2$, pharmaceuticals, organic molecules, and inorganic molecules.

In a particular embodiment, the disclosure provides a method of catalyzing the formation of one or more products from one or more reactants comprising contacting the one or more reactants with a Zr-MOF disclosed herein.

The disclosure also provides a method of making a Zr-MOF of the disclosure. The method comprises mixing zircony chloride (e.g., $ZrOCl_2 \cdot 8H_2O$) with a linking ligand of any of Formula I, I(a), I(b), I(c), or I(d) (see above) in DMF and the adding formic acid (98%). Heating the mixture to about 140° C. for about 2 days and then isolating a Zr-MOF having open metal sites. In addition, the disclosure provides Zr-MOFs made by the foregoing method.

DETAILED DESCRIPTION

Figure 1:
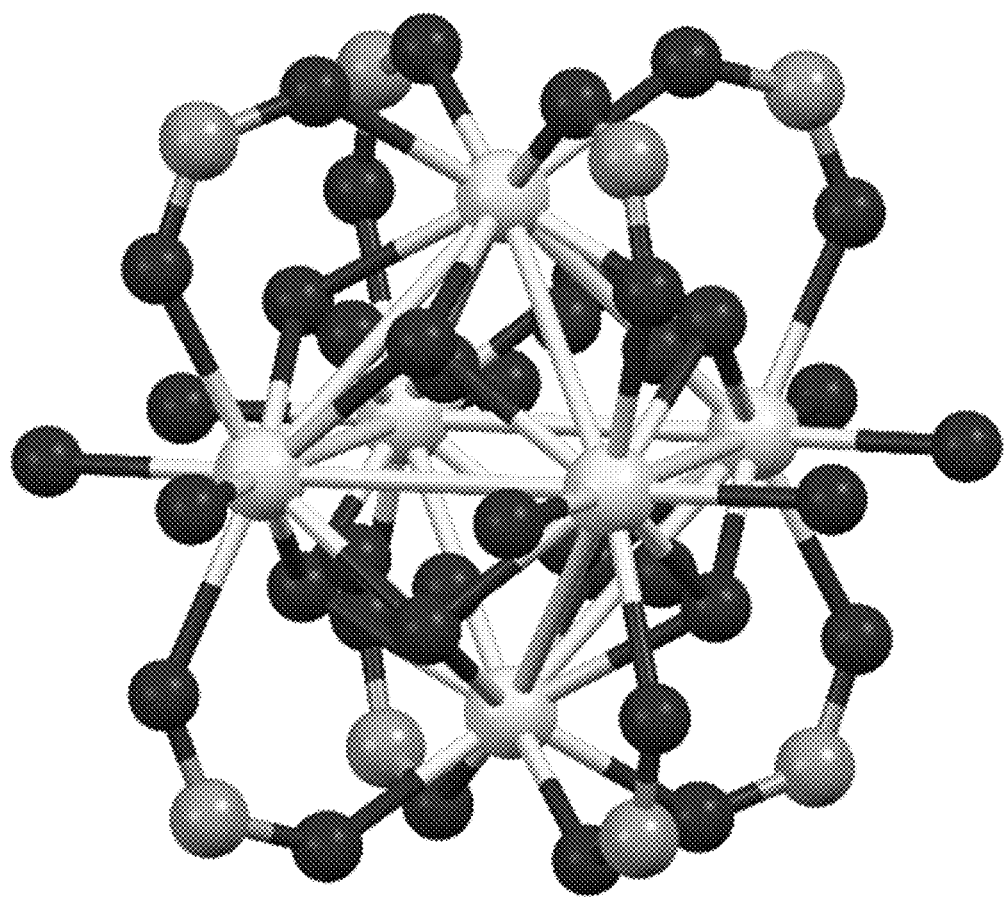
FIG. 1 provides a close-up view of the Zr inorganic secondary building unit (Zr-SBU): $Zr_6(\mu3\text{-}O)_4(\mu3\text{-}OH)_4(\text{---}COO)_8(OH)_4(H_2O)_n$.
Figure 2A:
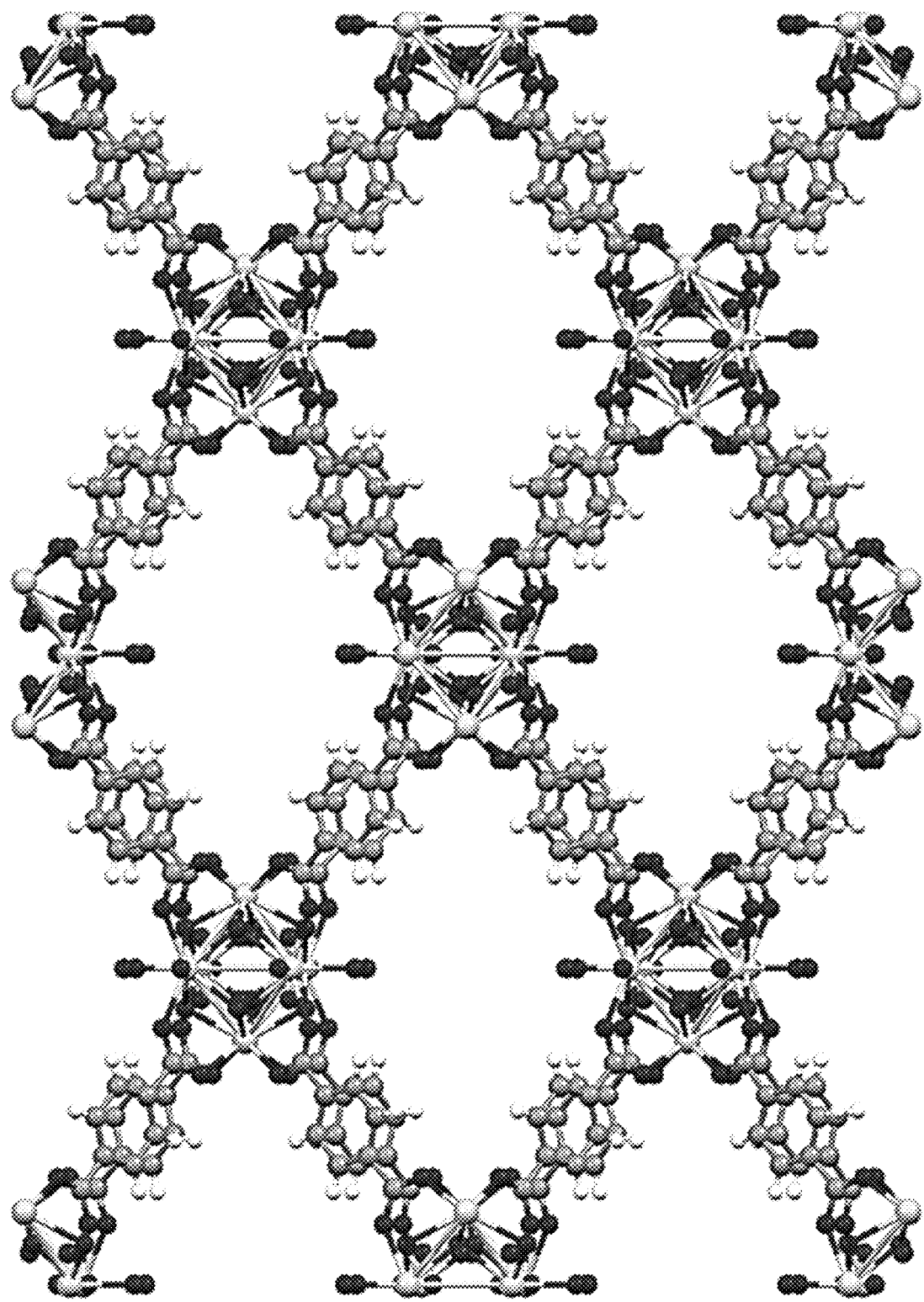
FIG. 2A-C provide three different views of the structure $(Zr_6(\mu3\text{-}O)_4(\mu3\text{-}OH)_4(BDC)_4(OH)_4(H_2O)_n$ of the Zr-MOF of the disclosure from crystallographic direction (A) (100), (B) (010), and (C) (001).
Figure 2B:
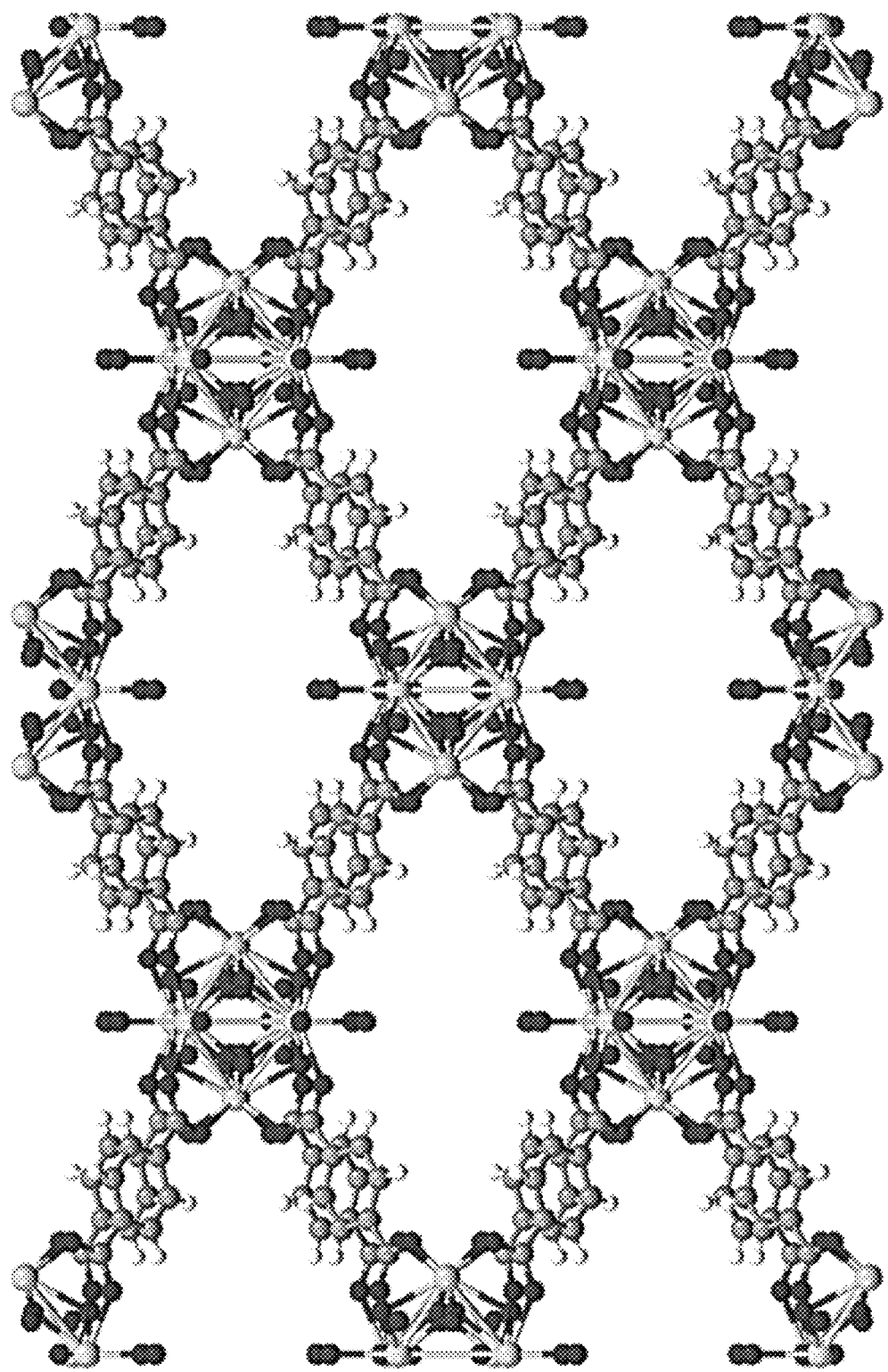
Figure 2C:
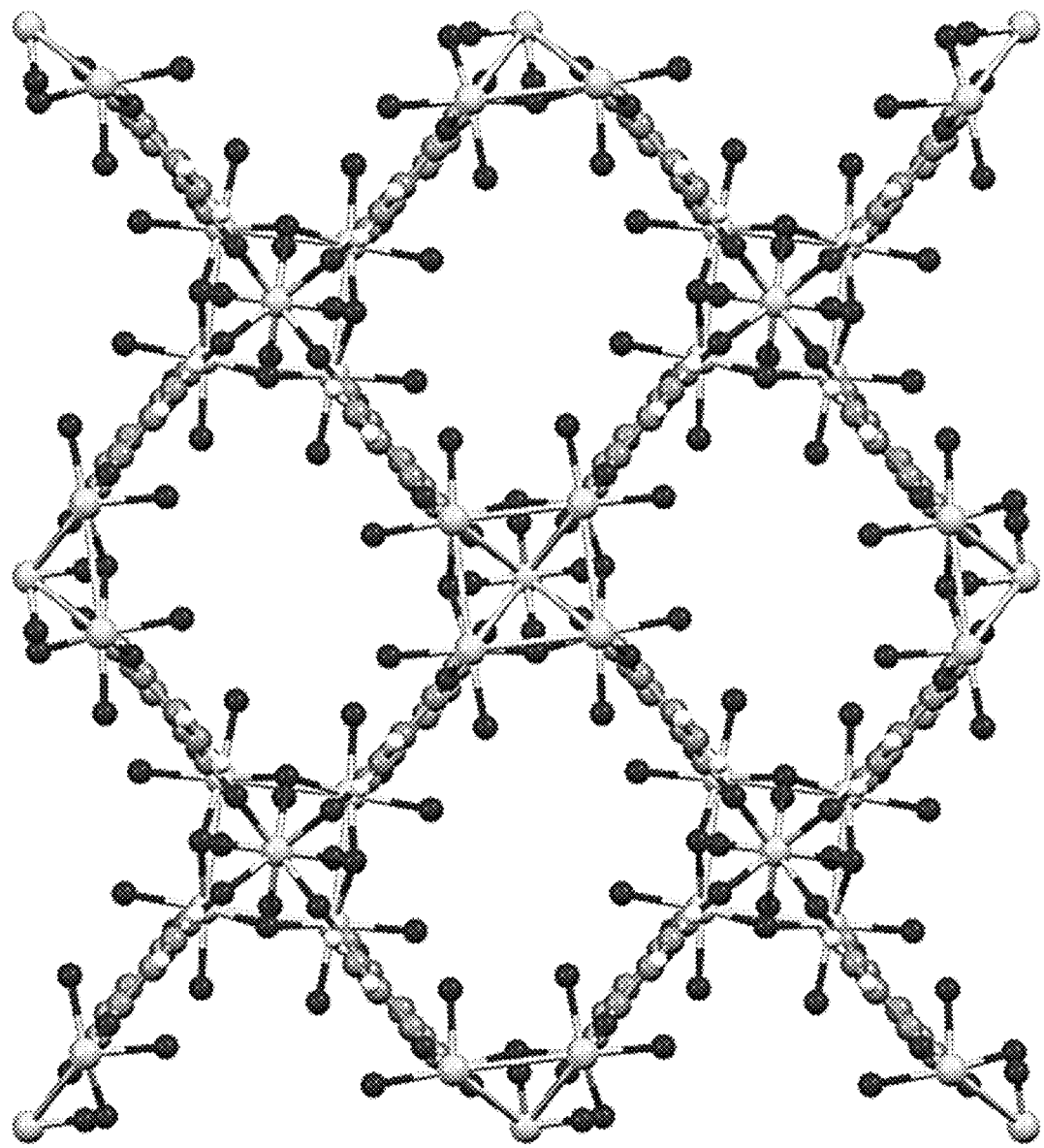
Figure 3:
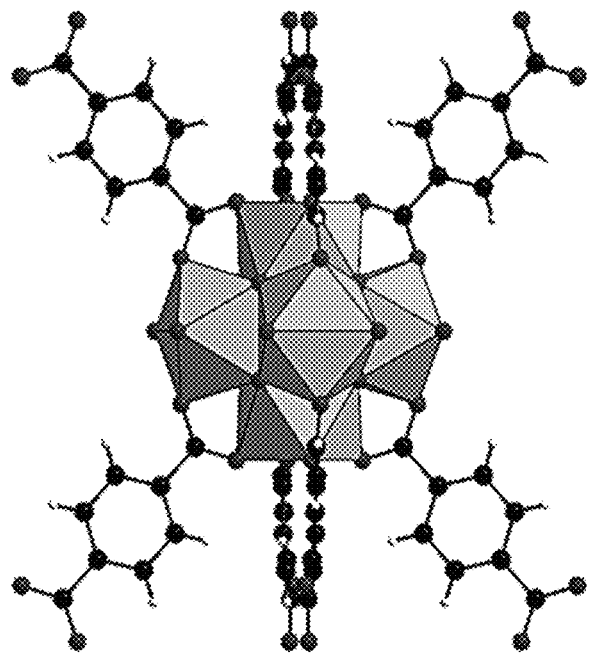
FIG. 3 provides crystallographic data from the solved structure of FIG. 2A-C. Also provided is the close-up view of the orientation of the linking ligands to the Zr-SBU from the solved structure of the Zr-MOF of the disclosure.
Figure 4:
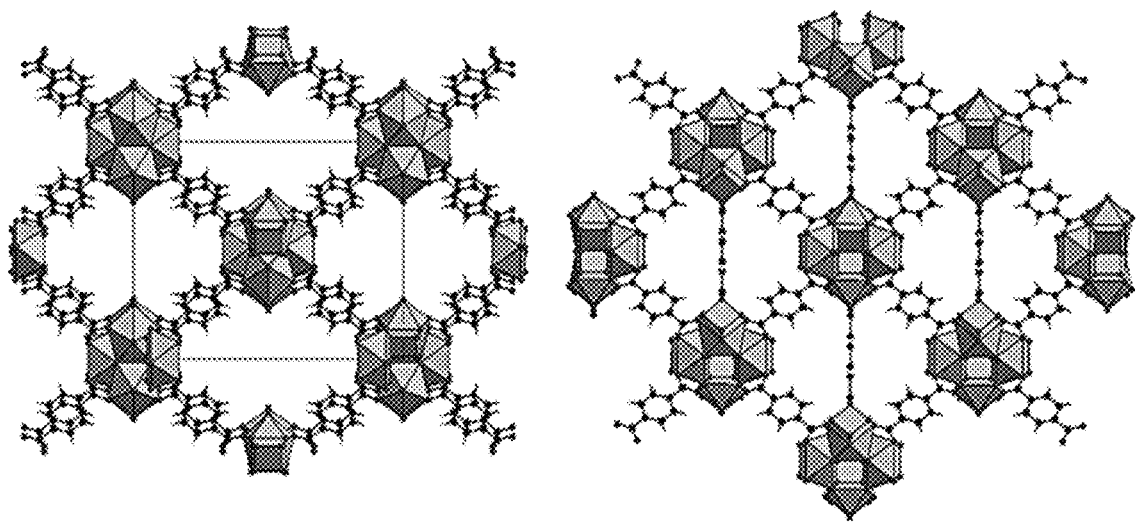
FIG. 4 provides a side-by-side comparison of a Zr-MOF of the disclosure (left) versus UiO-66 (right). As indicated, the Zr-MOF is missing a linker in one plane in comparison to UiO-66, providing for an open metal site. Moreover, there was slight expansion in the pores in the direction of the missing linker (~0.5 Å, about 2.5%). The density of the Zr-MOF of the disclosure was lower than UiO-66, 1.136 g $cm^{-3}$ to 1.170 g $cm^{-3}$, respectively.
Figure 5:
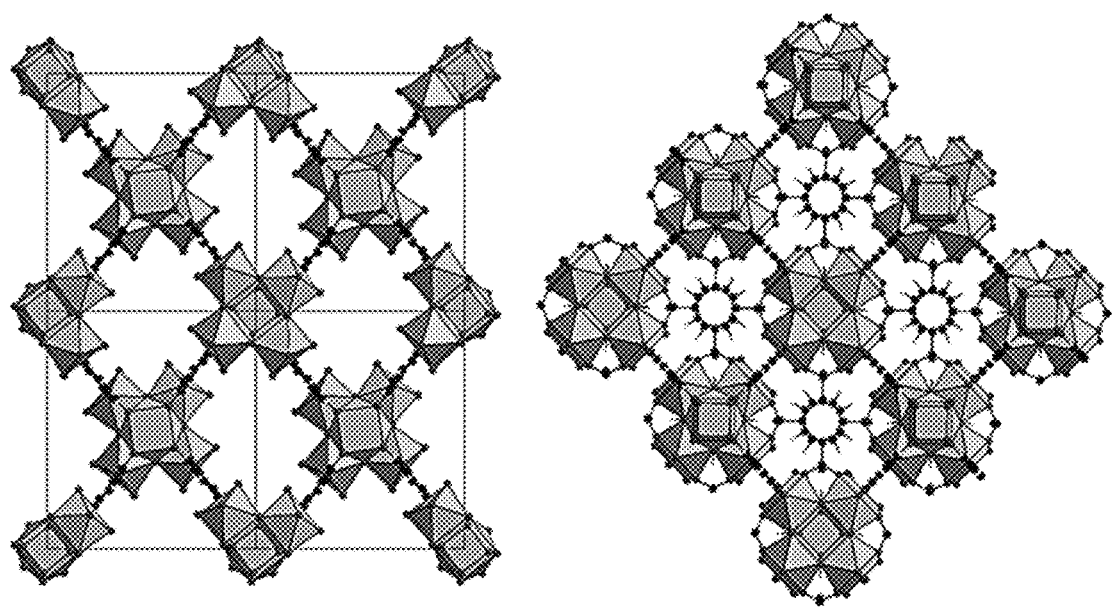
FIG. 5 provides a side-by-side comparison of a Zr-MOF of the disclosure (left) versus UiO-66 (right). As shown, the Zr-MOF of the disclosure has an orthorhombic crystal system, while UiO-66 has a tetragonal crystal system. As indicated, the differences in crystal system affect pore structure and dynamics.

As used herein and in the appended claims, the singular forms "a," "an," and "the" include plural referents unless the context clearly dictates otherwise. Thus, for example, reference to "a linking ligand" includes a plurality of such linking ligands and reference to "the framework" includes reference to one or more frameworks and equivalents thereof known to those skilled in the art, and so forth.

Also, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

All publications mentioned herein are incorporated by reference in full for the purpose of describing and disclosing methodologies that might be used in connection with the description herein. Moreover, with respect to any term that is presented in one or more publications that is similar to, or identical with, a term that has been expressly defined in this disclosure, the definition of the term as expressly provided in this disclosure will control in all respects.

Unless defined otherwise, all technical and scientific terms used herein have the same meaning as commonly understood to one of ordinary skill in the art. Although there are many methods and reagents similar or equivalent to those described herein, the exemplary methods and materials are presented herein.

A bond indicated by a dashed line indicates a bond that may be a single covalent bond or alternatively absent, thus the R group may also be absent.

The term "alkyl", refers to an organic group that is comprised of carbon and hydrogen atoms that contain single covalent bonds between carbons. Typically, an "alkyl" as used in this disclosure, refers to an organic group that contains 1 to 30 carbon atoms, unless stated otherwise. Where if there is more than 1 carbon, the carbons may be connected in a linear manner, or alternatively if there are more than 2 carbons then the carbons may also be linked in a branched fashion so that the parent chain contains one or more secondary, tertiary, or quaternary carbons. An alkyl may be substituted or unsubstituted, unless stated otherwise.

The term "alkenyl", refers to an organic group that is comprised of carbon and hydrogen atoms that contains at least one double covalent bond between two carbons. Typically, an "alkenyl" as used in this disclosure, refers to organic group that contains 2 to 30 carbon atoms, unless stated otherwise. While a $C_2$-alkenyl can form a double bond, an alkenyl group of three or more carbons can contain more than one double bond. It certain instances the alkenyl group will be conjugated, in other cases an alkenyl group will not be conjugated, and yet other cases the alkenyl group may have stretches of conjugation and stretches of non-conjugation. Additionally, if there are more than 2 carbons, the carbon atoms may be connected in a linear manner, or alternatively if there are more than 3 carbon atoms then the carbons may also be linked in a branched fashion so that the parent chain contains one or more secondary, tertiary, or quaternary carbons. An alkenyl may be substituted or unsubstituted, unless stated otherwise.

The term "alkynyl", refers to an organic group that is comprised of carbon and hydrogen atoms that contains a triple covalent bond between two carbons. Typically, an "alkynyl" as used in this disclosure, refers to organic group that contains 2 to 30 carbon atoms, unless stated otherwise. While a $C_2$-alkynyl can form a triple bond, an alkynyl group of three or more carbons can contain more than one triple bond. Where if there are more than 2 carbon atoms, the carbons may be connected in a linear manner, or alternatively if there are more than 4 carbon atoms then the carbon atoms may also be linked in a branched fashion so that the parent chain contains one or more secondary, tertiary, or quaternary carbons. An alkynyl may be substituted or unsubstituted, unless stated otherwise.

The term "aryl", as used in this disclosure, refers to a conjugated planar ring system with delocalized pi electron clouds that contain only carbon as ring atoms. An "aryl" for the purposes of this disclosure encompass from 1 to 12 aryl rings wherein when the aryl is greater than 1 ring the aryl rings are joined so that they are linked, fused, or a combination thereof. An aryl may be substituted or unsubstituted, or in the case of more than one aryl ring, one or more rings may be unsubstituted, one or more rings may be substituted, or a combination thereof.

The term "cycloalkyl", as used in this disclosure, refers to an alkyl that contains at least 3 carbon atoms but no more than 12 carbon atoms connected so that it forms a ring. A "cycloalkyl" for the purposes of this disclosure encompass from 1 to 12 cycloalkyl rings, wherein when the cycloalkyl is greater than 1 ring, then the cycloalkyl rings are joined so that they are linked, fused, or a combination thereof. A cycloalkyl may be substituted or unsubstituted, or in the case of more than one cycloalkyl ring, one or more rings may be unsubstituted, one or more rings may be substituted, or a combination thereof.

The term "cycloalkenyl", as used in this disclosure, refers to an alkene that contains at least 4 carbon atoms but no more than 12 carbon atoms connected so that it forms a ring. A "cycloalkenyl" for the purposes of this disclosure encompass from 1 to 12 cycloalkenyl rings, wherein when the cycloalkenyl is greater than 1 ring, then the cycloalkenyl rings are joined so that they are linked, fused, or a combination thereof. A cycloalkenyl may be substituted or unsubstituted, or in the case of more than one cycloalkenyl ring, one or more rings may be unsubstituted, one or more rings may be substituted, or a combination thereof.

The term "framework" as used herein, refers to an ordered structure comprised of secondary building units (SBUs) that can be linked together in defined, repeated and controllable manner, such that the resulting structure is characterized as being porous, periodic and crystalline. Typically, "frameworks" are two dimensional (2D) or three dimensional (3D) structures. Examples of "frameworks" include, but are not limited to, "metal-organic frameworks" or "MOFs", "zeolitic imidazolate frameworks" or "ZIFs", or "covalent organic frameworks" or "COFs". While MOFs and ZIFs comprise SBUs of metals or metal ions linked together by forming covalent bonds with linking clusters on organic linking ligands, COFs are comprised of SBUs of organic linking ligands that are linked together by forming covalent bonds via linking clusters. "Frameworks", as used herein, are highly ordered and extended structures that are not based upon a centrally coordinated ion, but involve many repeated secondary building units (SBUs) linked together. Accordingly, "frameworks" are orders of magnitude much larger than coordination complexes, and have different structural and chemical properties due to the framework's open and ordered structure.

The term "functional group" or "FG" refers to specific groups of atoms within molecules that are responsible for the characteristic chemical reactions of those molecules. While the same functional group will undergo the same or similar chemical reaction(s) regardless of the size of the molecule it is a part of, its relative reactivity can be modified by nearby functional groups. The atoms of functional groups are linked to each other and to the rest of the molecule by covalent bonds. Examples of FGs that can be used in this disclosure, include, but are not limited to, halos, hydroxyls, anhydrides, carbonyls, carboxyls, carbonates, carboxylates, aldehydes, haloformyls, esters, hydroperoxy, peroxy, ethers, orthoesters, carboxamides, amines, imines, imides, azides, azos, cyanates, isocyanates, nitrates, nitriles, isonitriles, nitrosos, nitros, nitrosooxy, pyridyls, sulfhydryls, sulfides, disulfides, sulfinyls, sulfos, thiocyanates, isothiocyanates, carbonothioyls, phosphinos, phosphonos, phosphates, $Si(OH)_3$, $Ge(OH)_3$, $Sn(OH)_3$, $Si(SH)_3$, $Ge(SH)_3$, $AsO_3H$, $AsO_3H$, $P(SH)_3$, $As(SH)_3$, $SO_3H$, $Si(OH)_3$, $Ge(OH)_3$, $Sn(OH)_3$, $Si(SH)_4$, $Ge(SH)_4$, $Sn(SH)_3$, $AsO_3H$, $AsO_3H$, $P(SH)_3$, and $As(SH)_3$.

As used herein a "guest species" means any chemical species that resides within the void regions of an open framework solid that is not considered integral to the framework. Examples include: molecules of the solvent that fill the void regions during the synthetic process, other molecules that are exchanged for the solvent such as during immersion (via diffusion) or after evacuation of the solvent molecules, such as gases in a sorption experiment. A guest species may be a drug, therapeutic agent or diagnostic agent to be "carried" by the framework of the disclosure. A chemical species is used herein to include peptides, polypeptides, nucleic acid molecules, and fatty acids. Typically, a drug will comprise a small organic molecule capable of filling or partially filling a void of a framework.

The term "heterocycle", as used in this disclosure, refers to ring structures that contain at least 1 non-carbon ring atom, and typically comprise from 3 to 12 ring atoms. A "heterocycle" for the purposes of this disclosure encompass from 1 to 12 heterocycle rings wherein when the heterocycle is greater than 1 ring the heterocycle rings are joined so that they are linked, fused, or a combination thereof. A heterocycle may be a hetero-aryl or nonaromatic, or in the case of more than one heterocycle ring, one or more rings may be nonaromatic, one or more rings may be hetero-aryls, or a combination thereof. A heterocycle may be substituted or unsubstituted, or in the case of more than one heterocycle ring one or more rings may be unsubstituted, one or more rings may be substituted, or a combination thereof. Typically, the non-carbon ring atom is N, O, S, Si, Al, B, or P. In case where there is more than one non-carbon ring atom, these non-carbon ring atoms can either be the same element, or combination of different elements, such as N and O. Examples of heterocycles include, but are not limited to: a monocyclic heterocycle such as, aziridine, oxirane, thiirane, azetidine, oxetane, thietane, pyrrolidine, pyrroline, imidazolidine, pyrazolidine, pyrazoline, dioxolane, sulfolane 2,3-dihydrofuran, 2,5-dihydrofuran tetrahydrofuran, thiophane, piperidine, 1,2,3,6-tetrahydro-pyridine, piperazine, morpholine, thiomorpholine, pyran, thiopyran, 2,3-dihydropyran, tetrahydropyran, 1,4-dihydropyridine, 1,4-dioxane, 1,3-dioxane, dioxane, homopiperidine, 2,3,4,7-tetrahydro-1H-azepine homopiperazine, 1,3-dioxepane, 4,7-dihydro-1,3-dioxepin, and hexamethylene oxide; and polycyclic heterocycles such as, indole, indoline, isoindoline, quinoline, tetrahydroquinoline, isoquinoline, tetrahydroisoquinoline, 1,4-benzodioxan, coumarin, dihydrocoumarin, benzofuran, 2,3-dihydrobenzofuran, isobenzofuran, chromene, chroman, isochroman, xanthene, phenoxathiin, thianthrene, indolizine, isoindole, indazole, purine, phthalazine, naphthyridine, quinoxaline, quinazoline, cinnoline, pteridine, phenanthridine, perimidine, phenanthroline, phenazine, phenothiazine, phenoxazine, 1,2-benzisoxazole, benzothiophene, benzoxazole, benzthiazole, benzimidazole, benztriazole, thioxanthine, carbazole, carboline, acridine, pyrolizidine, and quinolizidine. In addition to the polycyclic heterocycles described above, heterocycle includes polycyclic heterocycles wherein the ring fusion between two or more rings includes more than one bond common to both rings and more than two atoms common to both rings. Examples of such bridged heterocycles include quinuclidine, diazabicyclo[2.2.1]heptane and 7-oxabicyclo[2.2.1] heptane.

The terms "heterocyclic group", "heterocyclic moiety", "heterocyclic", or "heterocyclo" used alone or as a suffix or prefix, refers to a heterocycle that has had one or more hydrogens removed therefrom.

The term "hetero-aryl" used alone or as a suffix or prefix, refers to a heterocycle or heterocyclyl having aromatic character. Examples of heteroaryls include, but are not limited to, pyridine, pyrazine, pyrimidine, pyridazine, thiophene, furan, furazan, pyrrole, imidazole, thiazole, oxazole, pyrazole, isothiazole, isoxazole, 1,2,3-triazole, tetrazole, 1,2,3-thiadiazole, 1,2,3-oxadiazole, 1,2,4-triazole, 1,2,4-thiadiazole, 1,2,4-oxadiazole, 1,3,4-triazole, 1,3,4-thiadiazole, and 1,3,4-oxadiazole.

The term "hetero-" when used as a prefix, such as, hetero-alkyl, hetero-alkenyl, hetero-alkynyl, or hetero-hydrocarbon, for the purpose of this disclosure refers to the specified hydrocarbon having one or more carbon atoms replaced by non-carbon atoms as part of the parent chain. Examples of such non-carbon atoms include, but are not limited to, N, O, S, Si, Al, B, and P. If there is more than one non-carbon atom in the hetero-based parent chain then this atom may be the same element or may be a combination of different elements, such as N and O.

The term "optionally substituted" with respect to hydrocarbons, heterocycles, and the like, refers to structures that may be substituted, or alternatively be unsubstituted.

The term "substituted" with respect to hydrocarbons, heterocycles, and the like, refers to structures wherein hydrogen atoms have been replaced by a substituent.

The term "substituent" refers to an atom or group of atoms substituted in place of a hydrogen atom. For purposes of this disclosure, a substituent would include deuterium atoms.

The term "unsubstituted" with respect to hydrocarbons, heterocycles, and the like, refers to structures wherein the parent chain comprises no substituents.

Metal-organic frameworks are a relatively new class of porous materials that have received considerable attention for a number of applications. Initially these were limited to gas storage and gas separations, but they have recently expanded into a number of fields including catalysis, sensing, conductivity, and drug delivery. These materials typically consist of metal-based nodes, either single ions or clusters of ions, bridged in three dimensions by multitopic organic ligands. For use in specific applications their high surface areas, tunable pore surface properties, and potential scalability to industrial scale have made these materials an attractive target for study, manipulation and development.

The synthesis of metal-organic frameworks is typically achieved by employing a modular synthesis, where metal ions and organic ligands are combined, typically under solvothermal conditions, to afford a crystalline, porous material. Reported synthetic procedures encompass a wide range of temperatures, solvent compositions, reagent ratios, reagent concentrations, and reaction times, and the tuning of all of these parameters provides flexibility and diverse product resulting from the variables in synthesis of the materials.

A particularly interesting class of metal organic frameworks are those that contain accessible, coordinatively-unsaturated metal cations as these sites can dramatically enhance gas uptake or serve as a source of catalytic activity. While coordinatively-unsaturated metal centers have been generated in such materials via chelation by post-synthetically modified bridging ligands, or via insertion into open ligand sites, they are most often created by evacuation of frameworks that have metal-bound solvent molecules. This strategy has been employed to expose $M^{2+}$ cation sites in some of the most widely-studied frameworks, such as $M_3(btc)_2$ (M=Cu, Cr, Mo; $btc^{3-}$=1,3,5-benzenetricarboxylate) and $M_2(dobdc)$ (M=Mg, Mn, Fe, Co, Ni, Cu, Zn, Cd; $dobde^{4-}$=2,5-dioxido-1,4-benzenedicarboxylate).

Uses of a MOF are not limited to one application. As a basic material, a MOF can be used for various applications taking advantages of different properties of the MOF for different purpose. For example, a MOF, MOF-520, can be used for high pressure methane storage and also solving structure of molecules.

The MOFs disclosed herein comprise Zr based secondary building units (SBUs). Zr-based MOFs are generally characterized as having higher than average chemical stabilities in comparison to other MOFs, especially in aqueous environments. The MOFs disclosed herein are also characterized as having open metal sites. The open metal sites impart additional functionality to the MOFs disclosed herein, including the use of the MOFs for catalysis and specialized gas adsorption applications. The MOFs of the disclosure are further comprised of terephthalate-based linking ligands. Terephthalate itself, is very inexpensive and available from countless chemical suppliers.

In a particular embodiment, the disclosure provides for a Zr-MOF disclosed herein that comprises a plurality of zirconium secondary building units (SBUs) that are linked together by a plurality of linking ligands comprising the structure of Formula I:

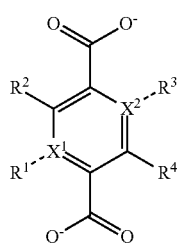

Formula I wherein, $X^1$ and $X^2$ are independently C or N, wherein if $X^1$ is an N then $R^1$ is absent, and wherein if $X^2$ is an N then $R^3$ is absent; $R^1$-$R^4$ are independently selected from the group consisting of H, D, optionally substituted $(C_1-C_6)$alkyl, optionally substituted $(C_1-C_5)$heteroalkyl, optionally substituted $(C_1-C_6)$ alkenyl, optionally substituted $(C_1-C_5)$ heteroalkenyl, optionally substituted $(C_1-C_6)$alkynyl, optionally substituted $(C_1-C_5)$heteroalkenyl, $(C_3-C_7)$cycloalkyl, $(C_5-C_7)$cycloalkenyl, aryl, heterocycle, hydroxyl, halo, aldehyde, nitrile, isonitrile, nitro, nitroso, cyanate, isocyanato, sulfhydryl, sulfino, sulfo, thiocyanate, isothiocyanate, carbonothioyl, boronic acid,

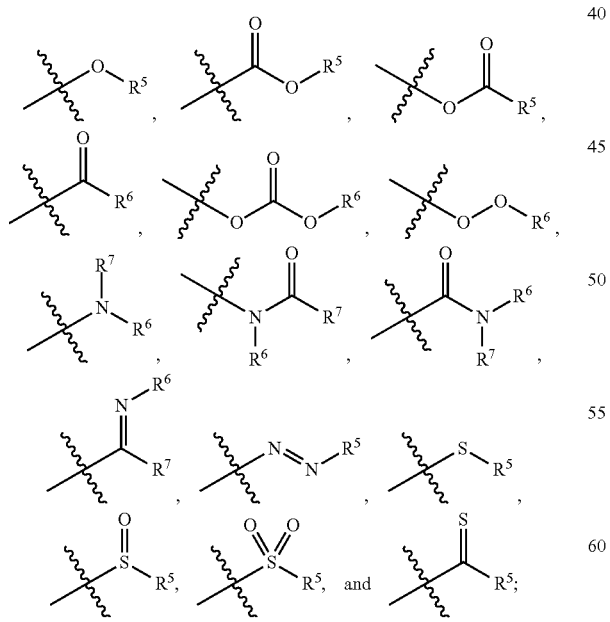

$R^5$ is selected from the group consisting of optionally substituted $(C_1-C_3)$alkyl, optionally substituted $(C_1-C_3)$alkenyl, optionally substituted $(C_1-C_3)$alkynyl, $(C_3-C_7)$cycloalkyl, $(C_5-C_7)$cycloalkenyl, aryl, and heterocycle; $R^6$ and $R^7$ are independently selected from H, D, optionally substituted $(C_1-C_3)$alkyl, optionally substituted $(C_1-C_3)$ alkenyl, optionally substituted $(C_1-C_3)$ alkynyl, $(C_3-C_7)$cycloalkyl, $(C_5-C_7)$ cycloalkenyl, aryl, and heterocycle; and wherein the Zr-MOF comprises a plurality of open metal sites.

In another embodiment, the disclosure provides for a Zr-MOF disclosed herein that comprises a plurality of zirconium SBUs that are linked together by a plurality of linking ligands comprising the structure of Formula I(a), Formula I(b), Formula I(c), and/or Formula I(d):

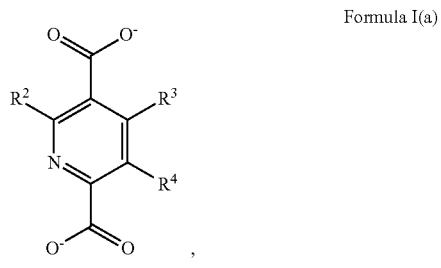

Formula I(a)

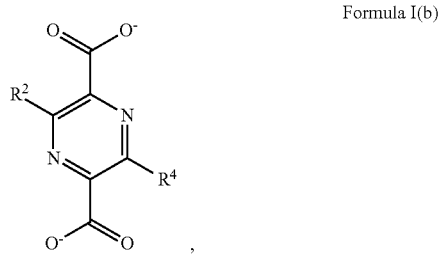

Formula I(b)

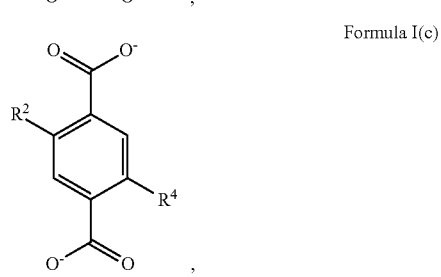

Formula I(c)

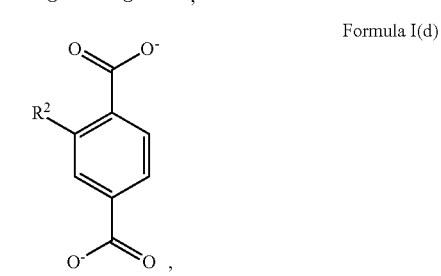

Formula I(d)

wherein, $R^2$-$R^4$ are independently selected from the group consisting of H, D, optionally substituted $(C_1-C_6)$alkyl, optionally substituted $(C_1-C_5)$heteroalkyl, optionally substituted $(C_1-C_6)$alkenyl, optionally substituted $(C_1-C_5)$ heteroalkenyl, optionally substituted $(C_1-C_6)$alkynyl, optionally substituted $(C_1-C_5)$heteroalkenyl, $(C_3-C_7)$cycloalkyl, $(C_5-C_7)$cycloalkenyl, aryl, heterocycle, hydroxyl, halo, aldehyde, nitrile, isonitrile, nitro, nitroso, cyanate, isocyanato, sulfhydryl, sulfino, sulfo, thiocyanate, isothiocyanate, carbonothioyl, boronic acid,

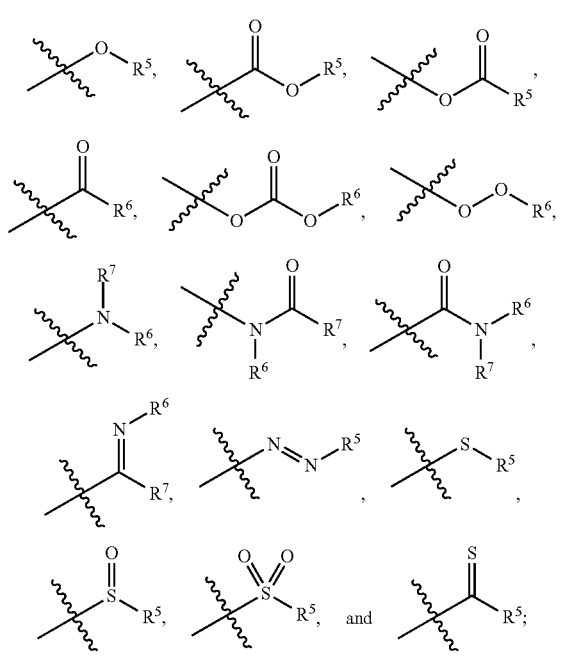

$R^5$ is selected from the group consisting of optionally substituted ($C_1$-$C_3$)alkyl, optionally substituted ($C_1$-$C_3$)alkenyl, optionally substituted ($C_1$-$C_3$)alkynyl, ($C_3$-$C_7$)cycloalkyl, ($C_5$-$C_7$)cycloalkenyl, aryl, and heterocycle; $R^6$ and $R^7$ are independently selected from H, D, optionally substituted ($C_1$-$C_3$)alkyl, optionally substituted ($C_1$-$C_3$) alkenyl, optionally substituted ($C_1$-$C_3$) alkynyl, ($C_3$-$C_7$)cycloalkyl, ($C_5$-$C_7$) cycloalkenyl, aryl, and heterocycle; and wherein the Zr-MOF comprises a plurality of open metal sites.

In a further embodiment, the disclosure provides for a Zr-MOF disclosed herein that comprises a plurality of zirconium SBUs that are linked together by a plurality of linking ligands that have a structure selected from:

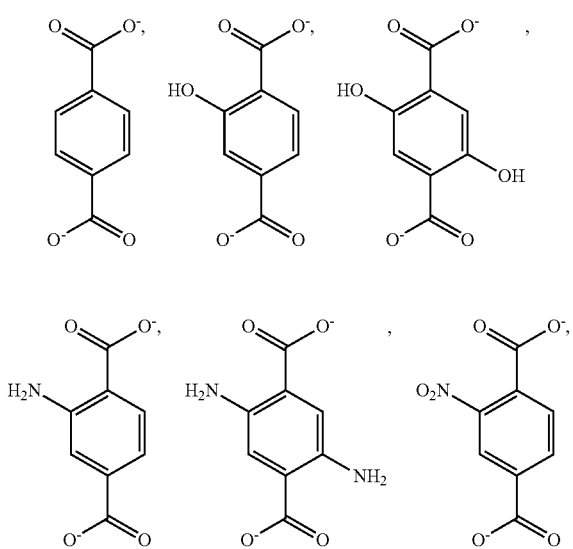

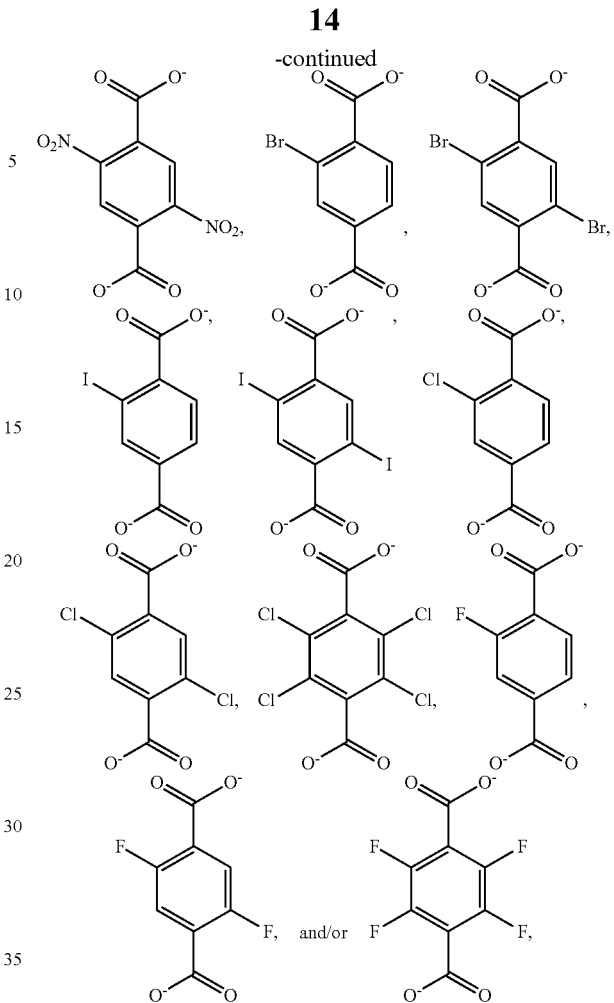

and wherein the Zr-MOF comprises a plurality of open metal sites.

In a particular embodiment, a Zr-MOF disclosed herein comprises a plurality of zirconium SBUs having the general formula of: $Zr_6(\mu3\text{-}O)_4(\mu3\text{-}OH)_4(\text{---COO})_8(OH)_4(H_2O)_n$ where n is an integer less than 10.

In comparison to UiO-66, a highly studied and industrially important Zr-terephthalate-based MOF in the field, the MOFs of the disclosure have notable advantages over UiO-66, including having larger pore size which enlarges the scope of guest molecules that can interact with the MOF, and also open metal sites which can be used for selective interactions with guest molecules for separation, storage, and catalysis, or can be modified further to change the properties of the MOFs.

The Zr-MOFs disclosed herein can be modified in many different ways. For example, the Zr-MOFs disclosed herein can be modified by isoreticular expansion or contraction, and by post synthetic modifications of the linking ligand and/or zirconium open metal sites, e.g., by reacting the linking ligand and/or zirconium open metal sites with one or more post-framework reactants.

In a further embodiment, the Zr-MOFs of the disclosure may be further modified by reacting with one or more post framework reactants that may or may not have denticity. In another embodiment, a Zr-MOF as-synthesized is reacted with at least one, at least two, or at least three post framework reactants. In yet another embodiment, a Zr-MOF as-synthesized is reacted with at least two post framework reactants. In a further embodiment, a Zr-MOF as-synthesized is reacted with at least one post framework reactant that will result in adding denticity to the framework.

The disclosure provides that a Zr-MOF disclosed herein can be modified by a post framework reactant by using chemical reactions that modify, substitute, or eliminate a functional group post-synthesis. These chemical reactions may use one or more similar or divergent chemical reaction mechanisms depending on the type of functional group and/or post framework reactant used in the reaction. Examples of chemical reaction include, but are not limited to, radical-based, unimolecular nucleophilic substitution (SN1), bimolecular nucleophilic substitution (SN2), unimolecular elimination (E1), bimolecular elimination (E2), E1cB elimination, nucleophilic aromatic substitution (SnAr), nucleophilic internal substitution (SNi), nucleophilic addition, electrophilic addition, oxidation, reduction, cycloaddition, ring closing metathesis (RCM), pericyclic, electrocyclic, rearrangement, carbene, carbenoid, cross coupling, and degradation. Other agents can be added to increase the rate of the reactions disclosed herein, including adding catalysts, bases, and acids.

In another embodiment, a post framework reactant adds at least one effect to a Zr-MOF of the disclosure including, but not limited to, modulating the aromatic hydrocarbon storage and/or separation ability of the Zr-MOF; modulating the sorption properties of the Zr-MOF; modulating the pore size of the MOF; modulating the catalytic activity of the MOF; modulating the conductivity of the Zr-MOF; modulating the metal-metal separation distance of the Zr-MOF; and modulating the sensitivity of the MOF to the presence of an analyte of interest. In a further embodiment, a post framework reactant adds at least two effects to the Zr-MOF of the disclosure including, but not limited to, modulating the aromatic hydrocarbon storage and/or separation ability of the MOF; modulating the sorption properties of the Zr-MOF; modulating the pore size of the MOF; modulating the catalytic activity of the Zr-MOF; modulating the conductivity of the Zr-MOF; modulating the metal-metal separation distance of the MOF; and modulating the sensitivity of the Zr-MOF to the presence of an analyte of interest.

In one embodiment, a post framework reactant can be a saturated or unsaturated heterocycle.

In another embodiment, a post framework reactant has 1-20 carbons with functional groups including atoms such as N, S, and O.

In yet another embodiment, a post framework reactant is selected to modulate the size of the pores of a Zr-MOF disclosed herein.

In another embodiment, a post framework reactant is selected to increase the specificity of a Zr-MOF disclosed herein to a particular aromatic hydrocarbon.

In yet another embodiment, a post framework reactant is selected to modulate the aromatic hydrocarbon separation ability of a Zr-MOF disclosed herein.

In a further embodiment, a post framework reactant is selected to modulate the aromatic hydrocarbon sorption properties of a Zr-MOF of the disclosure. In another embodiment, a post framework reactant is selected to promote or increase aromatic hydrocarbon sorption of a Zr-MOF disclosed herein.

In yet a further embodiment, a post framework reactant is selected to increase or add catalytic efficiency to a Zr-MOF disclosed herein.

In another embodiment, a post framework reactant is selected so that organometallic complexes can be tethered to a Zr-MOF of the disclosure. Such tethered organometallic complexes can be used, for example, as heterogeneous catalysts.

Sorption is a general term that refers to a process resulting in the association of atoms or molecules with a target material. Sorption includes both adsorption and absorption. Absorption refers to a process in which atoms or molecules move into the bulk of a porous material, such as the absorption of water by a sponge. Adsorption refers to a process in which atoms or molecules move from a bulk phase (that is, solid, liquid, or gas) onto a solid or liquid surface. The term adsorption may be used in the context of solid surfaces in contact with liquids and gases. Molecules that have been adsorbed onto solid surfaces are referred to generically as adsorbates, and the surface to which they are adsorbed as the substrate or adsorbent. Adsorption is usually described through isotherms, that is, functions which connect the amount of adsorbate on the adsorbent, with its pressure (if gas) or concentration (if liquid). In general, desorption refers to the reverse of adsorption, and is a process in which molecules adsorbed on a surface are transferred back into a bulk phase. The Zr-MOFs of the disclosure can therefore be used as selective adsorbents for fluids, gases or compounds, such as water, $CO_2$, methane, CO, hydrocarbons, $H_2$, harmful or toxic gases, natural products, pharmaceuticals, organic molecules, inorganic molecules, etc.

The Zr-MOFs of the disclosure are particularly suitable for containing gases due to their very high surface area and stability. The types of gases of interest are principally fuel gases such as hydrogen, methane, acetylene etc.; however other gases may be adsorbed and, under raised temperature or reduced pressure, desorbed, thus they can also be used to capture gaseous contaminants or to hold other gases such as for example nitrogen, carbon monoxide or carbon dioxide. Accordingly, the disclosure provides the use of a Zr-MOF to retain a gas, preferably hydrogen, methane or acetylene. The disclosure also provides a container, e.g. a fuel tank for a motor vehicle, comprising a sealable vessel containing a Zr-MOF, optionally containing a gas such as hydrogen, methane or acetylene.

In a particular embodiment, the disclosure provides for use of the Zr-MOFs of disclosure in gas storage or gas separation applications. As noted above, the Zr-MOFs of the disclosure are selective adsorbents for fluids, gases or compounds. Moreover, the adsorption properties of the Zr-MOFs disclosed herein are reversible, i.e., fluids, gases or compounds absorbed by the MOFs can be desorbed. Thus, the Zr-MOFs of the disclosure are ideally suited for storing fluids, gas, or compounds. Moreover, the Zr-MOFs of the disclosure are also suited for separating one or more component fluids from a multi-component fluid mixture.

The Zr-MOFs of the disclosure can be also utilized in drug storage and delivery, flavoring and drying agents in food, catalysis, tissue engineering, and as dietary supplements. Because the Zr-MOFs of the disclosure are water and acid stable, the can be used as drug reservoirs in the gastrointestinal tract. The disclosure also provides a dietary supplement comprising a Zr-MOF of the disclosure. Such Zr-MOFs are biocompatible and can be used for delivery of a drug or other biological agent or adsorption of a biological agent within the gastrointestinal tract. In another embodiment, the Zr-MOFs may be rendered expandable by absorption of a guest species within the gastrointestinal tract or made such that the framework is biodegradable during a desired time period there by, for example, giving the stimulus of being satiated.

Thus the disclosure provides physiologically tolerable Zr-MOFs for use in medicine. In one embodiment, the disclosure provides the use of a physiologically tolerable Zr-MOF for the manufacture of a sustained release medicament for use in a method of treatment of a human or non-human animal. For example, the disclosure provides a sustained release pharmaceutical composition comprising a physiologically tolerable Zr-MOF containing a drug substance, e.g. a substance with therapeutic or prophylactic effect or with utility in diagnosis. Thus, a Zr-MOF of the disclosure can be used as a method of treatment of a human or non-human animal subject which comprises administering an effective amount of a drug substance to a subject, the improvement comprising administering said substance contained at least in part within a physiologically tolerable Zr-MOF. Administration will generally be oral, rectal, vaginal or via subcutaneous depot placement. The drug substance may be any drug substance for which sustained release is desirable, e.g. an anti-infective, anti-inflammatory or anticancer agent, etc. Uptake of the drug substance by the MOF will generally be by contacting the MOF with a solution, e.g. an aqueous solution, of the drug substance.

The Zr-MOFs can further be used as a material for electronic devices, such as capacitors, super capacitors, ion conductors, semiconductors, proton conductors, and electron conductors. Alternatively, the Zr-MOFs can be used for bioimaging with tagged indicators.

Further, in view that the Zr-MOFs of the disclosure comprise open metal sites, it is expected that the Zr-MOFs can function as heterogeneous catalysts. The Zr-MOFs disclosed herein combine the benefits of heterogeneous catalysis like easy post reaction separation, catalyst reusability, high stability and homogeneous catalysis such as high efficiency, selectivity, controllability and mild reaction conditions. The Zirconium metals in the Zr-MOF structure are likely to act as Lewis acids. The Lewis acidic nature of such unsaturated Zr metal centers can activate the coordinated organic substrates for subsequent organic transformations.

Also provided by the disclosure are devices for the sorptive uptake of a chemical species. The device includes a sorbent comprising a Zr-MOF provided herein or obtained by the methods of the disclosure. The uptake can be reversible or non-reversible. In some embodiments, the sorbent is included in discrete sorptive particles. The sorptive particles may be embedded into or fixed to a solid liquid- and/or gas-permeable three-dimensional support. In some embodiment, the sorptive particles have pores for the reversible uptake or storage of liquids or gases and wherein the sorptive particles can reversibly adsorb or absorb the liquid or gas.

In some embodiments, a device provided herein comprises a storage unit for the storage of chemical species such as ammonia, carbon dioxide, carbon monoxide, hydrogen, amines, methane, oxygen, argon, nitrogen, argon, organic dyes, polycyclic organic molecules, and combinations thereof.

Also provided are methods for the sorptive uptake of a chemical species. The method includes contacting the chemical species with a sorbent that comprises a Zr-MOF provided herein. The uptake of the chemical species may include storage of the chemical species. In some embodiments, the chemical species is stored under conditions suitable for use as an energy source.

Also provided are methods for the sorptive uptake of a chemical species which includes contacting the chemical species with a device provided herein.

The disclosure provides a column filtration/separation column or fixed bed comprising a Zr-MOF disclosed herein that is capable of separating gases from other gaseous components in a multi-component gas. The retentate can be referred to as being "depleted" of the gas components. While the effluent stream can represent the desired product. In specific embodiments, a gas mixture is processed using the materials and devices of the disclosure to deplete the mixture of $CO_2$.

The disclosure includes simple separation systems where a fixed bed of adsorbent (e.g., a Zr-MOF) is exposed to a linear flow of a gas mixture. This type of setup is referred to as "fixed bed separation." However, the Zr-MOFs can be used for gas separation in more complex systems that include any number of cycles, which are numerous in the chemical engineering literature. Examples of these include pressure swing adsorption (PSA), temperature swing adsorption (TSA), a combination of those two, cycles involving low pressure desorption, and also processes where the MOF material is incorporated into a membrane and used in the numerous membrane-based methods of separation.

Pressure swing adsorption processes rely on the fact that under pressure, gases tend to be attracted to solid surfaces, or "adsorbed". The higher the pressure, the more gas is adsorbed; when the pressure is reduced, the gas is released, or desorbed. PSA processes can be used to separate gases in a mixture because different gases tend to be attracted to different solid surfaces more or less strongly. If a gas mixture such as air, for example, is passed under pressure through a vessel comprising a Zr-MOF of the disclosure that attracts $CO_2$ more strongly than other components of the mixed fluid gas, part or all of the $CO_2$ will stay in the bed, and the gas coming out of the vessel will be depleted in $CO_2$. When the bed reaches the end of its capacity to adsorb $CO_2$, it can be regenerated. It is then ready for another cycle of $CO_2$ separation.

Temperature swing adsorption functions similarly, however instead of the pressure being changed, the temperature is changed to adsorb or release the bound $CO_2$. Such systems can also be used with a Zr-MOF of the disclosure.

The disclosure provides an apparatus and method for separating one or more components from a multi-component gas using a separation system (e.g., a fixed-bed system and the like) having a feed side and an effluent side separated by a Zr-MOF of the disclosure. The Zr-MOF may comprise a column separation format.

As used herein a multi-component fluid refers to a liquid, air or gas. The fluid may be an atmospheric gas, air or may be present in an exhaust or other by-product of a manufacturing process.

In one embodiment of the disclosure, a gas separation material comprising a Zr-MOF is provided. Gases that may be stored or separated by the methods, compositions and systems of the disclosure include harmful gas molecules comprising a reactive side group capable of forming a covalent, hydrogen, ionic or other bond with a functional group of a Zr-MOF of the disclosure. In one embodiment, the reactive side group undergoes a Lewis acid/base reaction with the corresponding acid/base. Such harmful cases can comprise a reactive pair of electrons or be acceptors of a reactive pair of electrons present on a framework of the disclosure.

The disclosure is particularly suitable for treatment of air or gas emissions containing one or more harmful gases such as, for example, ammonia, ethylene oxide, chlorine, benzene, carbon dioxide, carbon monoxide, sulfur dioxide, nitrogen oxide, dichloromethane, and tetrahydrothiophene.

However, the disclosure is not limited to the foregoing gases, but rather any gas that can undergo reaction with a Zr-MOF of the disclosure. Particularly the Zr-MOF comprises a reactive side group that can bond (either covalently, ionically or through hydrogen bonds with a gas analyte). Devices comprising a Zr-MOF of the disclosure can be used to separate multi-component gases in a fluid comprising harmful gases. Such devices can be personnel safety devices, or devices found in emissions portions of a car, factory exhaust and the like. The compositions and methods can be used in combination with other gas removal compositions and devices including, for example, activated charcoal and the like.

Another embodiment provided by the methods and compositions of the disclosure comprises a sensor of harmful gas adsorption or absorption. In particular, as a Zr-MOF comes into contact and interact with harmful gases the Zr-MOF undergoes an optically detectable change. This change can be used to measure the presence of a harmful gas or alternatively to measure the saturation of a Zr-MOF in a setting (e.g., in a personnel device to determine exposure or risk).

The disclosure also provide method of making the Zr-MOF of the disclosure. Zr-MOF construction is effected in solution, typically an organic solvent, for example DMF, using a soluble precursor Zr compound and a suitable linking ligand typically in about equal molar ratios. The solution is generally heated at about 100 to 140° C. (typically about 140° C.) for about 2 days (time will vary depending upon the temperature, e.g., lower temperature a longer period of time). The resulting MOF should then be washed with solvent (conveniently the one used for the MOF formation reaction) and thoroughly dried. The surface area can be determined by use of nitrogen adsorption and the BET method.

The solvent used is conveniently an alkanol, dimethyl formamide (DMF), toluene, methylethyl ketone, dimethylsulphoxide, tetrahydrofuran, cyclohexanone, diethyl formamide, N-methyl pyrridone, acetone, an alkane, pyridine or acetonitrile. DMF is typically used.

The following examples are intended to illustrate but not limit the disclosure. While they are typical of those that might be used, other procedures known to those skilled in the art may alternatively be used.

Examples

General Approaches to Synthesize the Zr-MOFs.

The preparation of the Zr-MOFs of the disclosure can be carried out in either an aqueous or non-aqueous system. The solvent may be polar or non-polar as the case may be. The solvent can comprise the templating agent or the optional ligand containing a monodentate functional group. Examples of non-aqueous solvents include n-alkanes, such as pentane, hexane, benzene, toluene, xylene, chlorobenzene, nitrobenzene, cyanobenzene, aniline, naphthalene, naphthas, n-alcohols such as methanol, ethanol, n-propanol, isopropanol, acetone, 1,3,-dichloroethane, methylene chloride, chloroform, carbon tetrachloride, tetrahydrofuran, dimethylformamide, dimethylsulfoxide, N-methylpyrollidone, dimethylacetamide, diethylformamide, thiophene, pyridine, ethanolamine, triethylamine, ethlenediamine, and the like. Those skilled in the art will be readily able to determine an appropriate solvent based on the starting reactants and the choice of solvent is not believed to be crucial in obtaining the materials of the disclosure.

Templating agents can be used in the methods of the disclosure. Templating agents employed in the disclosure are added to the reaction mixture for the purpose of occupying the pores in the resulting crystalline base frameworks. In some variations of the disclosure, space-filling agents, adsorbed chemical species and guest species increase the surface area of the metal-organic framework. Suitable space-filling agents include, for example, a component selected from the group consisting of: (i) alkyl amines and their corresponding alkyl ammonium salts, containing linear, branched, or cyclic aliphatic groups, having from 1 to 20 carbon atoms; (ii) aryl amines and their corresponding aryl ammonium salts having from 1 to 5 phenyl rings; (iii) alkyl phosphonium salts, containing linear, branched, or cyclic aliphatic groups, having from 1 to 20 carbon atoms; (iv) aryl phosphonium salts, having from 1 to 5 phenyl rings; (v) alkyl organic acids and their corresponding salts, containing linear, branched, or cyclic aliphatic groups, having from 1 to 20 carbon atoms; (vi) aryl organic acids and their corresponding salts, having from 1 to 5 phenyl rings; (vii) aliphatic alcohols, containing linear, branched, or cyclic aliphatic groups, having from 1 to 20 carbon atoms; or (viii) aryl alcohols having from 1 to 5 phenyl rings.

Crystallization can be carried out by leaving the solution at room temperature or in isothermal oven for up to 300° C.; adding a diluted base to the solution to initiate the crystallization; diffusing a diluted base into the solution to initiate the crystallization; and/or transferring the solution to a closed vessel and heating to a predetermined temperature.

12 mg $ZrOCl_2 \cdot 8H_2O$ (0.037 mmol, Sigma-Aldrich, 98%) and 5 mg $H_2BDC$ (0.03 mmol) were dissolved in 2 mL DMF in 20 mL scintillation vial. 3 mL of formic acid (98%) was added to the vial as an additive. The vial was capped and placed in a pre-heated oven, 140° C., for 2 days. Block shaped crystals, $Zr_6(\mu 3\text{-}O)4(\mu 3\text{-}OH)_4$ $(BDC)_4$ $(OH)_4$ $(H_2O)_n$, were synthesized on the wall of the vial. UiO-66 single crystals were also synthesized as a mixture in the vial.

Thermal Gravimetric Analyses.

Zr-MOF samples are heated at a constant rate of 5° C. $min^{-1}$ up to 700° C. on a TA Instruments Q-500 series thermal gravimetric analyzer in ambient atmosphere. The Zr-MOF samples are heated at a constant rate of 5° C. $min^{-1}$ up to 700° C. in ambient atmosphere on a Scinco TGA-S1000 apparatus. When the samples contain guest molecules, two distinguishable weight losses were observed before the final plateau. The first large decrease in weight % is due to the evaporation of occluded guest molecules. In the case of mixed link MOFs, there are small shoulder traces in the TGA curve because of the difference in the decomposition temperature of the links.

Grand Canonical Monte Carlo Simulations & Geometric Area Calculations.

Atomistic grand canonical Monte Carlo (GCMC) simulations are performed to obtain nitrogen isotherms of the Zr-MOFs. Prior to GCMC simulations density functional theory (DFT) calculations were performed for each MOF to derive partial charges of the MOF atoms which are needed to calculate the electrostatic interaction energy between atoms during the GCMC simulations.

DFT Calculations.

DFT calculations are performed on clusters isolated from the unit cells of the Zr-MOFs, with the atomic coordinates taken from the experimental crystallographic data. These clusters include building units (e.g. metal-oxide corner and the linker) representative of their respective unit cells. All DFT calculations are performed with the Gaussian 03 software using the PBEPBE level of theory and the 6-31G* basis set, and partial atomic charges were extracted using the ChelpG method by fitting them to reproduce the electrostatic potential generated by the DFT calculations.

Grand canonical Monte Carlo (GCMC) simulations and Interaction potential. The interaction energy between the atoms is computed through the Lennard-Jones (LJ) and Coulomb potentials $$V_{ij} = 4\varepsilon_{ij}\left[\left(\frac{\sigma_{ij}}{r_{ij}}\right)^{12} - \left(\frac{\sigma_{ij}}{r_{ij}}\right)^{6}\right] + \frac{q_i q_j}{4\varepsilon_o r_{ij}}$$

where i and j are interacting atoms, and $r_{ij}$ is the distance between atoms i and j. $\varepsilon_{ij}$ and $\sigma_{ij}$ are the LJ well depth and diameter, respectively. $q_i$ and $q_j$ are the partial charges of the interacting atoms, and $\varepsilon_o$ is the dielectric constant. LJ parameters between different types of sites are calculated using the Lorentz-Berthelot mixing rules.

MOF models. LJ parameters for Zr-MOF atoms are taken from the DREIDING force field. Partial charges for MOF atoms are derived from DFT calculations as explained above.

General GCMC simulation settings. All GCMC simulations include a 10000 cycle equilibration period followed by a 10000 cycle production run. A cycle consists of n Monte Carlo steps; where n is equal to the number of molecules (which fluctuates during a GCMC simulation). All simulations include random insertion/deletion, translation and rotation moves of nitrogen molecules with equal probabilities. MOF atoms are held fixed at their crystallographic positions. An LJ cutoff distance of 12.5 Å was used for all simulations. The Ewald sum technique is used to compute the electrostatic interactions. One unit cell of the zr-MOF is used for the simulations. Nitrogen isotherms were simulated at 77 K up to 0.9 bar. Fugacities needed to run the GCMC simulations are calculated using the Peng-Robinson equation of state.

Low-pressure gas adsorption measurements. Low-pressure gas adsorption experiments (up to 760 torr) are carried out on a Quantachrome AUTOSORB-1 automatic volumetric instrument. Ultrahigh-purity-grade $N_2$ and He gases are used in all adsorption measurements. The N2 (77 K) isotherms are measured using a liquid nitrogen bath (77 K).

BET surface area of MOFs. A BET surface area is obtained by using the data points on the adsorption branch of the $N_2$ isotherm.

High-Pressure Gas Adsorption Measurements.

High-pressure gas adsorption isotherms for Zr-MOFs are gravimetrically recorded on a GHP-300 gravimetric high-pressure analyzer from VTI Corporation (currently TA Instruments). To obtain the excess adsorption isotherm, all data points are corrected for buoyancy and the thermal gradient that arises between the balance and the sample bucket. Equilibrium gas adsorption isotherms are measured using the static volumetric method in an HPA-100 from the VTI Corporation (currently Particulate Systems). Ultrahigh-purity grade $H_2$, $CH_4$, He (99.999% purity), and $CO_2$ gases (99.995% purity) are used throughout the high-pressure adsorption experiments. When $H_2$ gas is used, water and other condensable impurities were removed with a liquid nitrogen trap.

Estimation of Total Gas Uptake.

Although the surface excess mass is a useful concept, from the viewpoint of gas storage, the total amount that a material can store is more relevant. However, at high temperatures and pressures (i.e., above the critical point of gases), the density profile of the adsorbed phase becomes more diffused and, therefore, it is not possible to distinguish between the adsorbed and bulk phases with the present techniques. In this situation, the surface excess is the only experimentally accessible quantity, and there is not a reliable method to estimate the absolute adsorbed amount with high accuracy, although many efforts have been devoted to resolve this issue. Therefore, the absolute amount of hydrogen adsorbed was estimated using a simple equation: (total uptake)=(excess uptake)+(bulk density of gas)×(pore volume).

Needless to say, the volumetric gas uptake (e.g., g $L^{-1}$ unit) is also influenced by the packing factor of the crystalline materials. The packing density is influenced by both shape and size of the materials and usually is below unity, although these numbers for MOFs are not available here.

A number of embodiments have been described herein. Nevertheless, it will be understood that various modifications may be made without departing from the spirit and scope of this disclosure. Accordingly, other embodiments are within the scope of the following claims.

What is claimed is:

1. A zirconium containing metal organic framework comprising a plurality of zirconium secondary building units that are linked together by a plurality of linking ligands comprising the structure of Formula I:

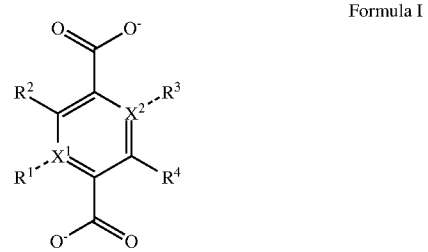

Formula I wherein,
$X^1$ and $X^2$ are independently C or N, wherein if $X^1$ is an N then $R^1$ is absent, and wherein if $X^2$ is an N then $R^3$ is absent;
$R^1$-$R^4$ are independently selected from the group consisting of H, D, optionally substituted ($C_1$-$C_6$)alkyl, optionally substituted ($C_1$-$C_5$)heteroalkyl, optionally substituted ($C_1$-$C_6$)alkenyl, optionally substituted ($C_1$-$C_5$) heteroalkenyl, optionally substituted ($C_1$-$C_6$)alkynyl, optionally substituted ($C_1$-$C_5$)heteroalkenyl, ($C_3$-$C_7$)cycloalkyl, ($C_5$-$C_7$)cycloalkenyl, aryl, heterocycle, hydroxyl, halo, aldehyde, nitrile, isonitrile, nitro, nitroso, cyanate, isocyanato, sulfhydryl, sulfino, sulfo, thiocyanate, isothiocyanate, carbonothioyl, boronic acid,

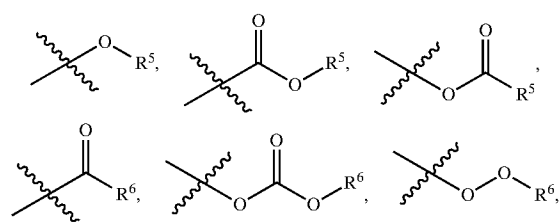

-continued

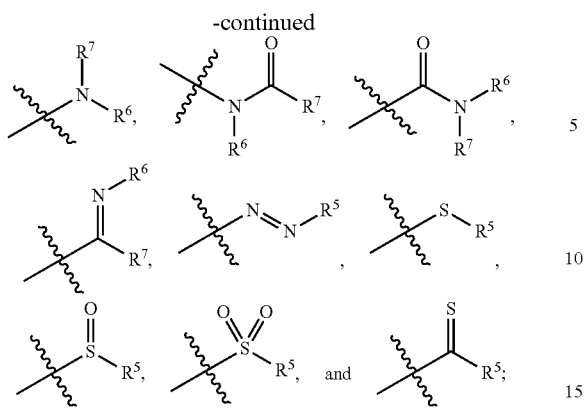

R[5] is selected from the group consisting of optionally substituted (C₁-C₃)alkyl, optionally substituted (C₁-C₃) alkenyl, optionally substituted (C₁-C₃)alkynyl, (C₃-C₇) cycloalkyl, (C₅-C₇)cycloalkenyl, aryl, and heterocycle;

R[6] and R[7] are independently selected from H, D, optionally substituted (C₁-C₃)alkyl, optionally substituted (C₁-C₃)alkenyl, optionally substituted (C₁-C₃)alkynyl, (C₃-C₇)cycloalkyl, (C₅-C₇)cycloalkenyl, aryl, and heterocycle, and wherein the zirconium containing metal organic framework comprises a plurality of open metal sites and has an orthorhombic crystal system.

2. The zirconium containing metal organic framework of claim 1, wherein the zirconium containing metal organic framework comprises a plurality of zirconium secondary building units that are linked together by a plurality of linking ligands comprising the structure of Formula I(a), Formula I(b), Formula I(c), and/or Formula I(d):

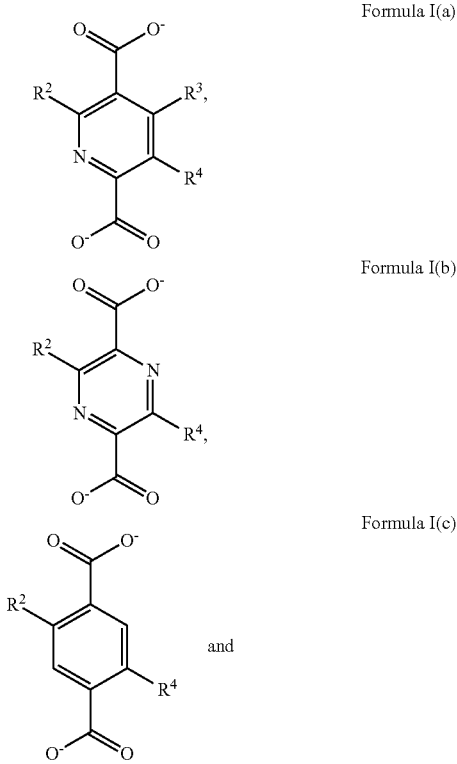

wherein,

R²-R⁴ are independently selected from the group consisting of H, D, optionally substituted (C₁-C₆)alkyl, optionally substituted (C₁-C₅)heteroalkyl, optionally substituted (C₁-C₆)alkenyl, optionally substituted (C₁-C₅) heteroalkenyl, optionally substituted (C₁-C₆)alkynyl, optionally substituted (C₁-05)heteroalkenyl, (C₃-C₇)cycloalkyl, (C₅-C₇)cycloalkenyl, aryl, heterocycle, hydroxyl, halo, aldehyde, nitrile, isonitrile, nitro, nitroso, cyanate, isocyanato, sulfhydryl, sulfino, sulfo, thiocyanate, isothiocyanate, carbonothioyl, boronic acid, R[5] is selected from the group consisting of optionally substituted (C₁-C₃)alkyl, optionally substituted (C₁-C₃) alkenyl, optionally substituted (C₁-C₃)alkynyl, (C₃-C₇) cycloalkyl, (C₅-C₇)cycloalkenyl, aryl, and heterocycle;

R[6] and R[7] are independently selected from H, D, optionally substituted (C₁-C₃)alkyl, optionally substituted (C₁-C₃)alkenyl, optionally substituted (C₁-C₃)alkynyl, (C₃-C₇)cycloalkyl, (C₅-C₇)cycloalkenyl, aryl, and heterocycle, and wherein the zirconium containing metal organic framework comprises a plurality of open metal sites.

3. The zirconium containing metal organic framework of claim 1, wherein the zirconium containing metal organic framework comprises a plurality of zirconium secondary building units that are linked together by a plurality of linking ligands that have a structure selected from:

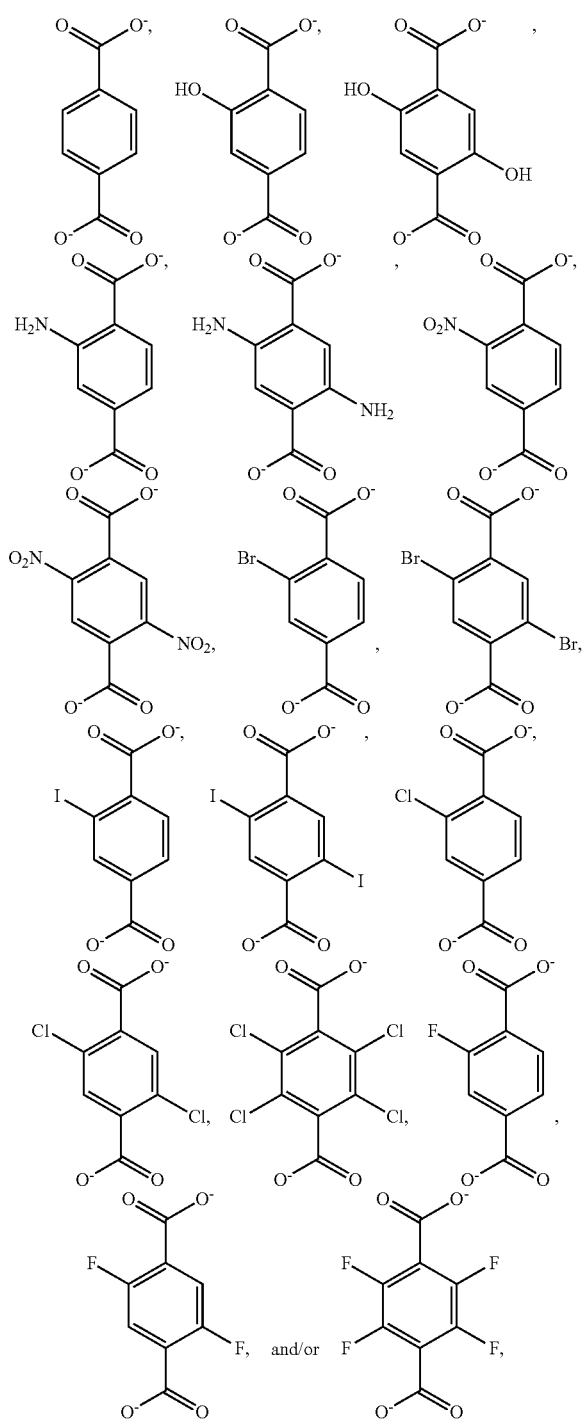

and wherein the zirconium containing metal organic framework comprises a plurality of open metal sites.

4. The zirconium containing metal organic framework of claim 1 made by mixing zirconyl chloride with the linking ligand in DMF and the adding formic acid (98%); heating the mixture to about 140° C. for about 2 days and then isolating a zirconium containing metal organic framework having open metal sites.

5. The zirconium containing metal organic framework of claim 1, wherein the plurality of zirconium secondary building units comprise the general formula of: $Zr_6(\mu3\text{-}O)_4(\mu3\text{-}OH)_4(\text{---COO})_8(OH)_4(H_2O)_n$, where n is an integer less than 10.

6. The zirconium containing metal organic framework of claim 1, wherein the zirconium containing metal organic framework has been activated by removing guest molecules via calcination or by treatment with supercritical $CO_2$.

7. A gas separation and/or gas storage device comprising a zirconium containing metal organic framework of claim 1.

8. The device of claim 7, wherein the gas storage device is a gas tank.

9. The device of claim 7, wherein the gas separation device is a purifier, filter, scrubber, pressure swing adsorption device, molecular sieve, hollow fiber membrane, ceramic membrane, cryogenic air separation device, or hybrid gas separation device.

10. A method of separating one or more gases from a gas mixture or storing a gas comprising contacting the gas mixture with a zirconium containing metal organic framework of claim 1.

11. The method of claim 10, wherein the gas mixture comprises a natural gas stream and the gases that are separated from the natural gas stream are acid gases and/or water vapor.

12. The method of claim 10, wherein the gas or gas mixture comprises harmful or toxic gases.

13. The method of claim 10, wherein the gas or gas mixture comprises water, CO2, methane, CO, hydrocarbons, Hz, pharmaceuticals, organic molecules, or inorganic molecules.

14. A method of catalyzing the formation of one or more products from one or more reactants comprising contacting the one or more reactants with a zirconium containing metal organic framework of claim 1.

* * * * *